US011872629B2

(12) United States Patent
Burstrom et al.

(10) Patent No.: US 11,872,629 B2
(45) Date of Patent: Jan. 16, 2024

(54) PRESSING ARRANGEMENT

(71) Applicant: Quintus Technologies AB, Vasteras (SE)

(72) Inventors: Per Burstrom, Vasteras (SE); Magnus Byggnevi, Vasteras (SE); Stefan Gustafsson, Vasteras (SE)

(73) Assignee: Quintus Technologies AB, Vasteras (SE)

( * ) Notice: Subject to any disclaimer, the term of this patent is extended or adjusted under 35 U.S.C. 154(b) by 516 days.

(21) Appl. No.: 16/617,205

(22) PCT Filed: May 31, 2017

(86) PCT No.: PCT/EP2017/063133
§ 371 (c)(1),
(2) Date: Nov. 26, 2019

(87) PCT Pub. No.: WO2018/219444
PCT Pub. Date: Dec. 6, 2018

(65) Prior Publication Data
US 2020/0122235 A1 Apr. 23, 2020

(51) Int. Cl.
*B22F 3/15* (2006.01)
*B30B 11/00* (2006.01)
(Continued)

(52) U.S. Cl.
CPC .............. *B22F 3/15* (2013.01); *B30B 11/002* (2013.01); *F27B 5/04* (2013.01); *F27D 7/04* (2013.01);
(Continued)

(58) Field of Classification Search
CPC ............................ F16K 11/1712; F16K 13/02
See application file for complete search history.

(56) References Cited

U.S. PATENT DOCUMENTS 5,118,289 A * 6/1992 Bergman .............. F27D 1/0033 419/25
5,251,880 A 10/1993 Ishii et al.
(Continued)

FOREIGN PATENT DOCUMENTS

DE 102007023703 A1 11/2008
RU 2302924 C2 7/2007
(Continued)

OTHER PUBLICATIONS

Wam Group, Low Profile Slide Valves (Year: 2014).*
(Continued)

*Primary Examiner* — Steven S Anderson, II
*Assistant Examiner* — Kurt J Wolford
(74) *Attorney, Agent, or Firm* — Harness, Dickey & Pierce, P.L.C.

(57) ABSTRACT

A pressing arrangement includes a pressure vessel comprising a furnace chamber. The furnace chamber comprises a load compartment arranged within the furnace chamber. The furnace chamber comprises at least one pressure medium guiding passage in fluid communication with the load compartment to form an inner convection loop, wherein pressure medium in the inner convection loop is guided through the load compartment and through the at least one pressure medium guiding passage and back to the load compartment, or vice versa. The pressure vessel comprises at least one adjustable throttle configured to selectively impede or obstruct pressure medium flow in at least a portion of the at least one pressure medium guiding passage, thereby selectively selectively impeding or obstructing a flow of pressure medium in the inner convection loop.

19 Claims, 6 Drawing Sheets

(51) Int. Cl.

| | |
|---|---|
| ***F27B 5/04*** | (2006.01) |
| ***B30B 15/34*** | (2006.01) |
| ***F27B 5/16*** | (2006.01) |
| ***F27B 5/18*** | (2006.01) |
| ***F27D 7/04*** | (2006.01) |
| ***F27D 7/06*** | (2006.01) |

(52) U.S. Cl.
CPC .......... *F27D 7/06* (2013.01); *B22F 2003/153* (2013.01); *B30B 15/34* (2013.01); *F27B 5/18* (2013.01); *F27B 2005/161* (2013.01); *F27B 2005/166* (2013.01)

(56) References Cited

U.S. PATENT DOCUMENTS

| | | | | |
|---|---|---|---|---|
| 6,514,066 B1 | 2/2003 | Bergman | | |
| 7,011,510 B2 | 3/2006 | Nakai et al. | | |
| 8,449,279 B2 | 5/2013 | Nakai et al. | | |
| 2011/0008741 A1* | 1/2011 | Gardin | B22F 3/003 | 432/19 |
| 2013/0071508 A1* | 3/2013 | Nakai | B30B 11/002 | 425/405.2 |
| 2013/0344451 A1 | 12/2013 | Gardin | | |
| 2016/0039163 A1 | 2/2016 | Nakai et al. | | |

FOREIGN PATENT DOCUMENTS

| | | | |
|---|---|---|---|
| RU | 2455112 | C2 | 7/2012 |
| RU | 2548557 | C2 | 4/2015 |
| WO | WO-03/070402 | A1 | 8/2003 |
| WO | WO-09/076973 | A1 | 6/2009 |
| WO | WO-12/069090 | A1 | 5/2012 |

OTHER PUBLICATIONS

International Search Report PCT/ISA/210 for International Application No. PCT/EP2017/063133 dated Feb. 27, 2018.

Written Opinion of the International Searching Authority PCT/ISA/237 for International Application No. PCT/EP2017/063133 dated Feb. 27, 2018.

International Preliminary Report on Patentability PCT/IPEA/409 for International Application No. PCT/EP2017/063133 dated Sep. 9, 2019.

Written Opinion of the International Preliminary Examining Authority for International Application No. PCT/EP2017/063133 dated May 2, 2019.

Russian Office Action dated Jun. 18, 2020 issued in corresponding Russian Appln. No. 2019142467 (with English translation).

* cited by examiner

PRESSING ARRANGEMENT

CROSS-REFERENCE TO RELATED APPLICATIONS

This application is a national phase under 35 U.S.C. § 371 of PCT International Application No. PCT/EP2017/063133 which has an International filing date of May 31, 2017, the entire contents of each of which are hereby incorporated by reference.

TECHNICAL FIELD

The present invention generally relates to the field of pressure treatment. In particular, the present invention relates to a pressing arrangement for treatment of at least one article by means of pressing, for example by means of hot pressing such as hot isostatic pressing (HIP).

BACKGROUND

Hot isostatic pressing (HIP) may for example be used for reducing or even eliminating porosity in castings (e.g., turbine blades) in order to substantially increase their service life and strength (e.g., their fatigue strength). HIP may in addition be used in manufacturing of products by means of compressing powder, which products are desired or required to be fully, or substantially fully, dense, and to have pore-free, or substantially pore-free, outer surfaces, etc.

An article to be subjected to pressure treatment by HIP may be positioned in a load compartment or chamber of a thermally insulated pressure vessel. A treatment cycle may comprise loading the article, treating the article, and unloading the article. Several articles may be treated simultaneously. The treatment cycle may be divided into several parts, or phases, such as a pressing phase, a heating phase, and a cooling phase. After loading an article into the pressure vessel, it may then be sealed, followed by introduction of a pressure medium (e.g., comprising an inert gas such as Argon-containing gas) into the pressure vessel and the load compartment thereof. The pressure and temperature of the pressure medium is then increased, such that the article is subjected to an increased pressure and an increased temperature during a selected period of time. The increase in temperature of the pressure medium, which in turn may cause an increase in temperature of the article, is provided by means of a heating element or furnace arranged in a furnace chamber of the pressure vessel. The pressures, temperatures and treatment times may for example depend on the desired or required material properties of the treated article, the particular field of application, and the required quality of the treated article. Pressures in HIP may for example be in the range from 200 bar to 5000 bar, such as from 800 bar to 2000 bar. Temperatures in HIP may for example be in the range from 300° C. to 3000° C., such as from 800° C. to 2000° C.

There is an increasing desire for capability or capacity to customize the treatment cycle with respect to the temperature during the treatment cycle, for example so as to be able to carry out a rapid and uniform cooling of an article during the cooling phase. For example, during cooling phase, it may be required or desired to decrease the temperature of the pressure medium (and thereby the temperature of the article) rapidly. During a heating phase, it may be required or desired to increase the temperature of the pressure medium (and thereby the temperature of the article) in a homogeneous manner.

SUMMARY

In view of the above, a concern of the present invention is to provide a pressing arrangement that facilitates controlling the operation thereof based on the current phase of the treatment cycle during which the pressing arrangement is operated so as to achieve a relatively high overall operational efficiency of the pressing arrangement.

To address at least one of this concern and other concerns, a pressing arrangement and a method in a pressing arrangement in accordance with the independent claims are provided. Preferred embodiments are defined by the dependent claims.

According to a first aspect, there is provided a pressing arrangement. The pressing arrangement is for treatment of at least one article by means of hot pressing. The pressing arrangement includes a pressure vessel. The pressure vessel comprises a furnace chamber which comprises a furnace. The furnace chamber is at least in part surrounded by a heat insulated casing. The furnace chamber comprises a load compartment which is arranged within the furnace chamber. The load compartment is configured to hold at least one article to be treated. The furnace chamber—or the load compartment—is arranged so as to allow for a flow of pressure medium through the load compartment. The furnace chamber comprises at least one pressure medium guiding passage. The at least one pressure medium guiding passage of the furnace chamber may be formed or defined in the furnace chamber at least during a treatment cycle, i.e. when the pressing arrangement is operated so as to treat at least one article. The at least one pressure medium guiding passage is at least in part formed between the heat insulated casing and the load compartment. The at least one pressure medium guiding passage is in fluid communication with the load compartment so as to form an inner convection loop. The inner convection loop is configured such that pressure medium in the inner convection loop is guided through the load compartment and through the at least one pressure medium guiding passage of the furnace chamber and back to the load compartment, or vice versa. The pressure vessel comprises at least one adjustable throttle. The at least one adjustable throttle is configured to selectively impede or obstruct pressure medium flow in at least a portion of the at least one pressure medium guiding passage of the furnace chamber, thereby selectively impeding or obstructing a flow of pressure medium (e.g., a circulating pressure medium flow) in the inner convection loop.

By the at least one adjustable throttle being configured to selectively impede or obstruct pressure medium flow in at least a portion of the at least one pressure medium guiding passage of the furnace chamber, thereby selectively impeding or obstructing a flow of pressure medium in the inner convection loop, it is meant that the at least one adjustable throttle may be adjusted, or controlled, so as to impede or obstruct pressure medium flow in at least a portion of the at least one pressure medium guiding passage of the furnace chamber (e.g., to a selected extent or degree), thereby impeding or obstructing a flow of pressure medium in the inner convection loop (e.g., to a selected extent or degree), or that the at least one adjustable throttle may be adjusted, or controlled, so as to not impede or obstruct pressure medium flow in at least a portion of the at least one pressure medium guiding passage of the furnace chamber, thereby not impeding or obstructing a flow of pressure medium in the inner convection loop.

The pressing arrangement may be configured to treat at least one article by means of hot pressing such that the treatment of the at least one article comprises at least one heating phase, in which the at least one article is heated, and possibly at least one cooling phase, in which the at least one article is cooled. During the at least one heating phase, it may be desired to cause (or maintain) a circulating pressure medium flow in the inner convection loop. During the at least one heating phase, pressure medium may be circulating in the inner convection loop in the furnace chamber, such that pressure medium in the furnace chamber—and in particular pressure medium within the load compartment—may be heated by the furnace in the furnace chamber while flowing through the load compartment and subsequently exiting the load compartment. After the pressure medium has exited the load compartment it may be guided through the at least one pressure medium guiding passage of the furnace chamber and eventually return to the load compartment. By means of the inner convection loop, a relatively high rate of heating of the at least one article may be achieved. Also, by means of allowing for a flow pressure medium in the inner convection loop during the at least one heating phase, any temperature gradients within the furnace chamber may be kept relatively small during the at least one heating phase. In other words, the at least one article may be heated in a relatively homogeneous manner.

As indicated in the foregoing, the at least one adjustable throttle may be configured to selectively impede pressure medium flow in at least a portion of the at least one pressure medium guiding passage of the furnace chamber, thereby impeding a flow of pressure medium (e.g., a circulating pressure medium flow) in the inner convection loop, which may entail that the circulating flow of pressure medium in the inner convection loop is reduced but that there still may be some circulating flow of pressure medium in the inner convection loop. The at least one adjustable throttle may be configured to selectively obstruct pressure medium flow in at least a portion of the at least one pressure medium guiding passage of the furnace chamber, thereby obstructing a flow of pressure medium (e.g., a circulating pressure medium flow) in the inner convection loop, which may entail that there is no, or substantially no, circulating flow of pressure medium in the inner convection loop.

During the at least one heating phase, in which the at least one article is heated, a circulating flow of pressure medium in the inner convection loop of the furnace chamber is generally desired. By way of adjusting the at least one adjustable throttle so as to not impede or obstruct pressure medium flow in at least a portion of the at least one pressure medium guiding passage of the furnace chamber during the at least one heating phase, the flow of pressure medium in the inner convection loop during the at least one heating phase may be increased so as to be at a relatively high level.

During the at least one cooling phase, in which the at least one article is cooled, a circulating flow of pressure medium in the inner convection loop of the furnace chamber may not be desired, in order to facilitate achieving a relatively high rate of cooling of the at least one article. Instead, it may be desired to direct a flow of relatively cool pressure medium that has been cooled in an outer cooling loop outside the furnace chamber into the furnace chamber. Thereby, thermal energy from the at least one article in the load compartment may be transferred to the relatively cold flow of pressure medium which is guided through the furnace chamber (and the load compartment), after which the flow of pressure medium may be guided out of the furnace chamber and back into the outer cooling loop. The outer cooling loop may for example be arranged such that pressure medium that has exited the furnace chamber is guided in the pressure vessel for example so as to pass in the proximity of inner surfaces of the outer walls and/or end closures of the pressure vessel, during which thermal energy from the pressure medium may have been transferred to the outside of the pressure vessel via the outer walls of the pressure vessel.

By means of the at least one adjustable throttle—which allows for selectively impeding or obstructing pressure medium flow in at least a portion of the at least one pressure medium guiding passage of the furnace chamber, flow of pressure medium (e.g., a circulating pressure medium flow) in at least a portion of the inner convection loop may be selectively impeded or obstructed. For example, the at least one adjustable throttle may be adjusted so as to impede or obstruct pressure medium flow in at least a portion of the at least one pressure medium guiding passage of the furnace chamber during at least one cooling phase, and so as to not impede or obstruct pressure medium flow in at least a portion of the at least one pressure medium guiding passage of the furnace chamber during the at least one heating phase. As mentioned in the foregoing, during a cooling phase, a circulating flow of pressure medium in the inner convection loop of the furnace chamber may not be desired, while during a heating phase, a circulating flow of pressure medium in the inner convection loop of the furnace chamber may be desired. Thus, by means of the at least one adjustable throttle, the pressure medium flows in the pressure vessel may be controlled based on the current phase of the treatment cycle during which the pressing arrangement is operated so as to treat at least one article, so as facilitate increasing the overall operational efficiency of the pressing arrangement. For example, during at least one heating phase, the at least one adjustable throttle may be controlled so as to ‘open’ the inner convection loop (to allow for a circulating pressure medium flow in the inner convection loop), while during at least one cooling phase, the at least one adjustable throttle may be controlled so as to ‘close’ the inner convection loop. Also, by means of impeding or obstructing pressure medium flow in at least a portion of the at least one pressure medium guiding passage of the furnace chamber during at least one cooling phase, the flow of pressure medium from the outer cooling loop into the furnace chamber may be increased (as compared to if pressure medium flow in the at least one pressure medium guiding passage of the furnace chamber would not be impeded or obstructed), whereby a relatively high rate of cooling of the at least one article may be achieved during the at least one cooling phase.

In the context of the present application, by an adjustable throttle it is meant any suitable mechanism by which a flow of pressure medium, e.g., within the pressure vessel, can be controlled by means of constriction or obstruction of the pressure medium flow. Examples of how the at least one adjustable throttle may be realized will be described in the following.

The pressure vessel may comprise at least one flow generator. The at least one flow generator may be configured to selectively—and possibly controllably—generate a flow of pressure medium into the load compartment by transportation of pressure medium from a space, which is located below a bottom insulating portion of the pressure vessel and above a bottom end portion, of the pressure vessel, and injection of the pressure medium into the load compartment. The at least one flow generator may for example comprise an ejector arrangement (e.g., a single stage ejector, or a multi-stage ejector). In alternative or in addition, the at least one flow generator may comprise one or more fans, pumps, or the like, which may be arranged to cause a flow of pressure medium into the load compartment.

The at least one adjustable throttle may be arranged in a pressure medium flow path of the flow of pressure medium into the load compartment, generated by transportation of pressure medium from the space.

The at least one adjustable throttle may be arranged so as to selectively impede or obstruct pressure medium flow in at least a portion of the at least one pressure medium guiding passage of the furnace chamber—and thereby selectively impede or obstruct pressure medium flow in at least a portion of the inner convection loop—based on a flow level of any flow of pressure medium into the load compartment, generated by transportation of pressure medium upwards from the space, that is incident or impinging on the at least one adjustable throttle. For example, the at least one adjustable throttle may be arranged so as to impede or even obstruct pressure medium flow in at least a portion of the at least one pressure medium guiding passage of the furnace chamber if the flow level of the flow of pressure medium into the load compartment, which is generated by transportation of pressure medium upwards from the space, that is incident or impinging on the at least one adjustable throttle exceeds a selected flow level threshold, and otherwise not impede or obstruct pressure medium flow in at least a portion of the at least one pressure medium guiding passage of the furnace chamber.

For example, the pressing arrangement may be configured such that during at least one cooling phase, the flow of pressure medium into the load compartment, which is generated by transportation of pressure medium upwards from the space, may exceed some predefined flow level. The at least one adjustable throttle may be arranged so as to impede or even obstruct pressure medium flow in at least a portion of the at least one pressure medium guiding passage of the furnace chamber, whereby a circulating flow of pressure medium in the inner convection loop may be obstructed or impeded, if the flow level of the flow of pressure medium into the load compartment, which is generated by transportation of pressure medium upwards from the space, that is incident or impinging on the at least one adjustable throttle exceeds the predefined flow level—e.g. during a cooling phase—and otherwise (e.g., during a heating phase) not impede or obstruct pressure medium flow in at least a portion of the at least one pressure medium guiding passage of the furnace chamber, whereby a circulating flow of pressure medium in the inner convection loop may not be impeded or obstructed.

The at least one adjustable throttle may be arranged so as to be controllable with respect to impeding or obstructing pressure medium flow in at least a portion of the at least one pressure medium guiding passage of the furnace chamber. The at least one adjustable throttle may for example be provided with an actuating mechanism or system by means of which the at least one adjustable throttle may be controlled so as to controllably impede or obstruct pressure medium flow in at least a portion of the at least one first pressure medium guiding passage of the furnace chamber. The actuating mechanism or system may for example be a pneumatic actuating mechanism or system.

The pressing arrangement may comprise a control unit, or actuator, which may be communicatively coupled to the at least one adjustable throttle for controlling the at least one adjustable throttle. The control unit may be configured to control the at least one adjustable throttle so as to controllably impede or obstruct pressure medium flow in at least a portion of the at least one pressure medium guiding passage of the furnace chamber. The control unit may for example be configured to control the at least one adjustable throttle so as to controllably impede or obstruct pressure medium flow in at least a portion of the at least one pressure medium guiding passage of the furnace chamber based on the flow level of any flow of pressure medium into the load compartment generated by transportation of pressure medium upwards from the space.

As mentioned in the foregoing, the pressing arrangement may be configured to treat at least one article by means of hot pressing such that the treatment of the at least one article comprises at least one heating phase, in which the at least one article is heated, and at least one cooling phase, in which the at least one article is cooled. The control unit may be configured to control the at least one adjustable throttle so as to impede or obstruct pressure medium flow in at least a portion of the at least one pressure medium guiding passage of the furnace chamber during the at least one cooling phase (and thereby, to possibly impede or obstruct a circulating flow of pressure medium in the inner convection loop), and so as to not impede or obstruct pressure medium flow in at least a portion of the at least one pressure medium guiding passage of the furnace chamber during the at least one heating phase (possibly so as to not impede or obstruct a circulating flow of pressure medium in the inner convection loop). For example, during at least one heating phase, the at least one adjustable throttle may be controlled so as to 'open' the inner convection loop, while during at least one cooling phase, the at least one adjustable throttle may be controlled so as to 'close' the inner convection loop.

According to one or more embodiments of the present invention, the pressure vessel may be arranged such that a pressure medium flow path of the at least one pressure medium guiding passage of the furnace chamber and a pressure medium flow path of the flow of pressure medium into the load compartment, generated by transportation of pressure medium from the space, intersect at at least one pressure medium flow path intersection. The at least one adjustable throttle may be arranged at the at least one pressure medium flow path intersection.

The flow of pressure medium into the load compartment may for example be generated by injection of the pressure medium into the load compartment by way of a pressure medium conduit (or several pressure medium conduits). The pressure medium conduit may have an inlet arranged within the space, an intermediate portion coupled to the inlet, and an outlet coupled to the intermediate portion.

The intermediate portion may for example extend through the bottom insulating portion and into the load compartment. The intermediate portion may extend through the bottom insulating portion and into the load compartment, such that the outlet of the pressure medium conduit is within the load compartment or at the periphery of the load compartment. In alternative, the outlet of the pressure medium conduit may be coupled to an opening in the bottom insulating portion such that pressure medium exiting the pressure medium conduit by way of its outlet may be injected into the load compartment.

The at least one pressure medium flow path intersection may for example be arranged at at least one opening in the pressure medium conduit, which for example may be arranged between the inlet of the pressure medium conduit and the bottom insulating portion. The at least one opening in the pressure medium conduit may be located in a (side) wall of the pressure medium conduit, e.g., in the intermediate portion thereof.

The at least one adjustable throttle may be configured to selectively impede or obstruct pressure medium flow through the at least one opening in the pressure medium conduit. The at least one adjustable throttle may for example be arranged such that it can be actuated based on any pressure difference between the pressure in the pressure medium conduit and pressure on the outside of the pressure medium conduit, e.g., at the at least one opening in the pressure medium conduit. The at least one adjustable throttle may for example be configured such that it impedes or obstructs pressure medium flow through the at least one opening in the pressure medium conduit if there is a higher pressure within the pressure medium conduit compared to on the outside of the pressure medium conduit, e.g., at the at least one opening in the pressure medium conduit. Thus, the at least one adjustable throttle may for example be actuated responsive to an overpressure condition within the pressure medium conduit. Otherwise, if there is not a higher pressure within the pressure medium conduit compared to on the outside of the pressure medium conduit, e.g., at the at least one opening in the pressure medium conduit, the pressure medium flow through the at least one opening in the pressure medium conduit may not be impeded or obstructed.

According to one or more embodiments of the present invention, the at least one adjustable throttle may comprise at least one first movable throttle body arranged so as to selectively impede or obstruct pressure medium flow through the at least one opening in the pressure medium conduit. The at least one first throttle body may be movable at least between a position in which the at least one first throttle body closes the at least one opening in the pressure medium conduit, so as to obstruct pressure medium flow through the at least one opening in the pressure medium conduit, and a position in which the at least one first throttle body is spaced from the at least one opening in the pressure medium conduit, so as to not impede or obstruct pressure medium flow through the at least one opening in the pressure medium conduit. The at least one first throttle body may be arranged within or outside the pressure medium conduit.

The at least one first throttle body may for example have a shape corresponding to the at least one opening in the pressure medium conduit. The at least one first throttle body may for example be pivotally arranged within the pressure medium conduit or outside the pressure medium conduit. The at least one first throttle body may be movable between a position in which the at least one first throttle body closes the at least one opening in the pressure medium conduit by pivoting the at least one first throttle body over or into the at least one opening in the pressure medium conduit, thereby obstructing pressure medium flow through the at least one opening in the pressure medium conduit, and a position in which the at least one first throttle body is spaced from the at least one opening in the pressure medium conduit by pivoting the at least one first throttle body so as not be over or in the at least one opening in the pressure medium conduit, whereby pressure medium flow through the at least one opening in the pressure medium conduit is not impeded or obstructed by the at least one first throttle body.

The at least one first throttle body may for example be slidably arranged on the outside or the inside of the pressure medium conduit. The at least one first throttle body may be movable between a position in which the at least one first throttle body closes the at least one opening in the pressure medium conduit by sliding the at least one first throttle body over the outside or the inside of the pressure medium conduit so that the at least one first throttle body overlies the at least one opening in the pressure medium conduit, thereby obstructing pressure medium flow through the at least one opening in the pressure medium conduit, and a position in which the at least one first throttle body is spaced from the at least one opening in the pressure medium conduit by sliding the at least one first throttle body over the outside or the inside of the pressure medium conduit so that the at least one first throttle body does not overlie the at least one opening in the pressure medium conduit, whereby pressure medium flow through the at least one opening in the pressure medium conduit is not impeded or obstructed by the at least one first throttle body.

According to one or more embodiments of the present invention, the pressure medium conduit may be provided with at least one pressure medium distribution conduit arranged at the outlet of the pressure medium conduit for injecting the pressure medium transported from the space into the load compartment. The at least one pressure medium distribution conduit may be referred to as, and/or comprise, a diffusor or a pressure medium mixing conduit. The at least one pressure medium distribution conduit may comprise at least one pressure medium guiding passage permitting pressure medium from the at least one pressure medium guiding passage of the furnace chamber to enter the load compartment, or vice versa. The at least one adjustable throttle may be configured to selectively impede or obstruct pressure medium flow through the at least one pressure medium guiding passage of the at least one pressure medium distribution conduit. Possibly, the at least one pressure medium flow path intersection may be arranged at or in the at least one pressure medium guiding passage.

According to one or more embodiments of the present invention, the load compartment may comprise at least one opening in a side wall, or lateral wall, of the load compartment. The at least one opening in a side wall of the load compartment may permit pressure medium from the at least one pressure medium guiding passage of the furnace chamber to enter the load compartment, or vice versa. The at least one adjustable throttle may be configured to selectively impede or obstruct pressure medium flow through the at least one opening in the side wall of the load compartment. A part of the inner convection loop may for example be along the outer surface of the side wall of the load compartment in which the at least one opening may be arranged. Possibly, the at least one pressure medium flow path intersection may be arranged at the at least one opening in a side wall, or lateral wall, of the load compartment.

The load compartment may be defined by a load basket configured to hold at least one article to be treated. The at least one opening in a side wall of the load compartment may for example be constituted by at least one opening in a side wall of the load basket. For example, at least a part or portion of the load basket may be releasably (or detachably) arranged (i.e. non-fixedly arranged) in the furnace chamber.

According to another example, at least a part or portion of the load basket may be releasably (or detachably) arranged in the furnace chamber, while another part or portion of the load basket (or the remaining part or portion of the load basket) may be fixedly arranged in the furnace chamber. For example, the at least one opening in a side wall of the load compartment may be constituted by at least one opening in a side wall of a part or portion of the load basket that is fixedly arranged in the furnace chamber.

The at least one adjustable throttle may comprise at least one second movable throttle body arranged so as to selectively impede or obstruct pressure medium flow through the at least one opening in the side wall of the load compartment. The at least one second throttle body may be movable at least between a position in which the at least one second throttle body closes the at least one opening in the side wall of the load compartment, so as to obstruct pressure medium flow through the at least one opening in the side wall of the load compartment, and a position in which the at least one second throttle body is spaced from the at least one opening in the side wall of the load compartment, so as to not impede or obstruct pressure medium flow through the at least one opening in the side wall of the load compartment. The at least one second throttle body may for example be arranged outside the load compartment.

The at least one second throttle body may for example have a shape or form corresponding to the at least one opening in the side wall of the load compartment. The at least one second throttle body may for example be pivotally arranged outside the load compartment, but it could possibly be arranged inside the load compartment. The at least one second throttle body may be movable between a position in which the at least one second throttle body closes the at least one opening in the side wall of the load compartment by pivoting the at least one second throttle body over or into the at least one opening in the side wall of the load compartment, thereby obstructing pressure medium flow through the at least one opening in the side wall of the load compartment, and a position in which the at least one second throttle body is spaced from the at least one opening in the side wall of the load compartment by pivoting the at least one second throttle body so as not be over or in the at least one opening in the side wall of the load compartment, whereby pressure medium flow through the at least one opening in the side wall of the load compartment is not impeded or obstructed by the at least one second throttle body.

The at least one second throttle body may for example be slidably arranged on the outside or the inside of the load compartment (e.g., on an outer surface of the side wall of the load compartment or on an inner surface of the side wall of the load compartment). The at least one second throttle body may be movable between a position in which the at least one second throttle body closes the at least one opening in the side wall of the load compartment by sliding the at least one second throttle body over the outside or the inside of the load compartment so that the at least one second throttle body overlies the at least one opening in the side wall of the load compartment, thereby obstructing pressure medium flow through the at least one opening in the side wall of the load compartment, and a position in which the at least one second throttle body is spaced from the at least one opening in the side wall of the load compartment by sliding the at least one second throttle body over the outside or the inside of the load compartment so that the at least one second throttle body does not overlie the at least one opening in the side wall of the load compartment, whereby pressure medium flow through the at least one opening in the side wall of the load compartment is not impeded or obstructed by the at least one second throttle body.

In alternative or in addition, and according to one or more embodiments of the present invention, the at least one adjustable throttle may comprise at least one valve. The at least one valve may for example comprise a butterfly valve and/or a ball valve.

According to a second aspect, there is provided a method in a pressing arrangement for treatment of at least one article by means of hot pressing. The pressing arrangement may comprise or be constituted by a pressing arrangement according to the first aspect. The pressing arrangement including a pressure vessel comprises a furnace chamber comprising a furnace, wherein the furnace chamber is at least in part surrounded by a heat insulated casing and comprises a load compartment arranged within the furnace chamber. The load compartment is configured to hold at least one article to be treated. The furnace chamber is arranged so as to allow for a flow of pressure medium through the load compartment. The furnace chamber comprises at least one pressure medium guiding passage at least in part formed between the heat insulated casing and the load compartment and being in fluid communication with the load compartment so as to form an inner convection loop. Pressure medium in the inner convection loop is guided through the load compartment and through the at least one pressure medium guiding passage of the furnace chamber and back to the load compartment, or vice versa. The method comprises selectively impeding or obstructing pressure medium flow in at least a portion of the at least one pressure medium guiding passage of the furnace chamber by means of at least one adjustable throttle, thereby selectively impeding or obstructing a flow of pressure medium in the inner convection loop.

Further objects and advantages of the present invention are described in the following by means of exemplifying embodiments. It is noted that the present invention relates to all possible combinations of features recited in the claims. Further features of, and advantages with, the present invention will become apparent when studying the appended claims and the description herein. Those skilled in the art realize that different features of the present invention can be combined to create embodiments other than those described herein.

BRIEF DESCRIPTION OF THE DRAWINGS

Exemplifying embodiments of the present invention will be described below with reference to the accompanying drawings.

All the figures are schematic, not necessarily to scale, and generally only show parts which are necessary in order to elucidate embodiments of the present invention, wherein other parts may be omitted or merely suggested.

DETAILED DESCRIPTION

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments are provided by way of example so that this disclosure will convey the scope of the present invention to those skilled in the art.

Figure 1:
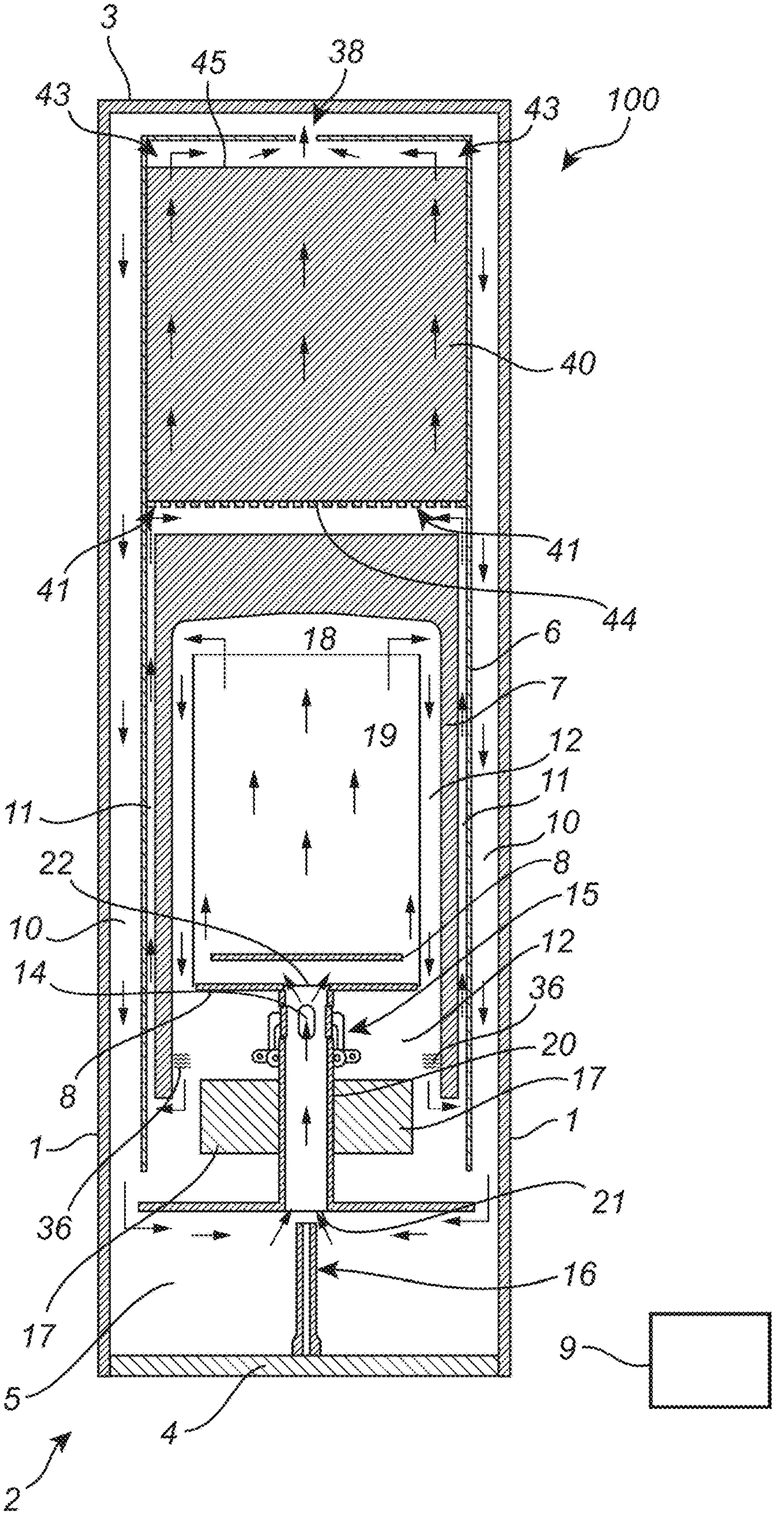
FIGS. 1 and 2 are schematic, in part sectional, side views of a pressing arrangement according to an embodiment of the present invention.
Figure 2:
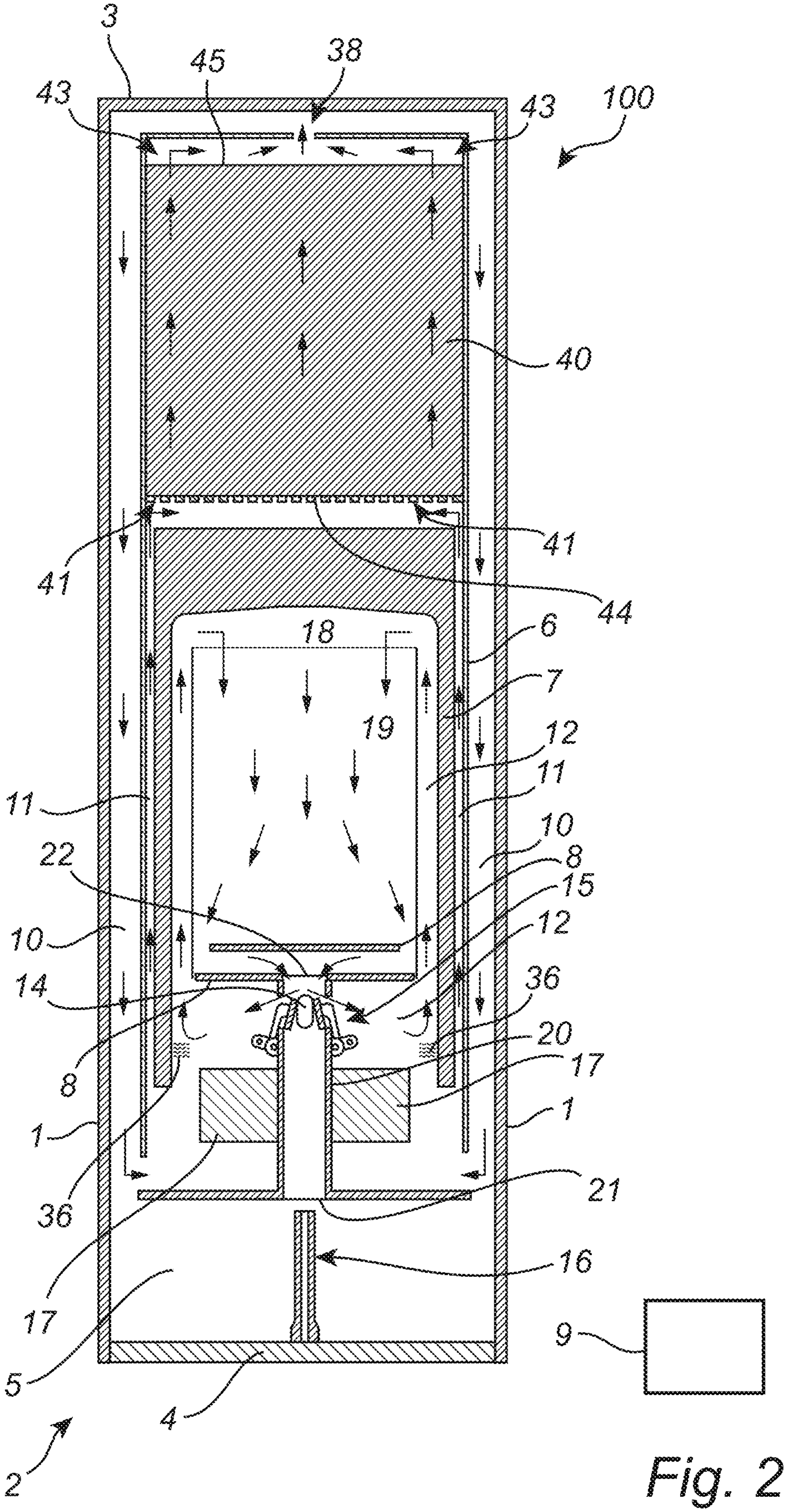

FIGS. 1 and 2 are schematic, in part sectional, side views of a pressing arrangement 100 according to an embodiment of the present invention. The pressing arrangement 100 is configured to treat at least one article (not shown in FIGS. 1 and 2) by means of hot pressing, for example such that the treatment of the at least one article comprises at least one heating phase, in which the at least one article is heated, and at least one cooling phase, in which the at least one article is cooled. As will be further described in the following, FIG. 1 illustrates the pressing arrangement 100 during a cooling phase, and FIG. 2 illustrates the pressing arrangement 100 during a heating phase.

The pressing arrangement 100 includes a pressure vessel 2, which includes a pressure cylinder 1, a top end closure 3, and a bottom end portion 4. The pressure vessel 2 includes a furnace chamber 18 which comprises a furnace, or heater or heating elements, for heating of the pressure medium in the pressure vessel 2 for example during a heating phase of a treatment cycle. The furnace is schematically indicated in FIG. 1 by the reference numerals 36. In accordance with the embodiment of the present invention illustrated in FIG. 1, the furnace 36 may be arranged at a lower portion of the furnace chamber 18, and in proximity to the inner side, or lateral, surfaces of the furnace chamber 18. It is to be understood that different configurations and arrangements of the furnace 36 in relation to, e.g., within, the furnace chamber 18 are possible. Any implementation of the furnace 36 with regard to arrangement thereof in relation to, e.g., within, the furnace chamber 18 may be used in any one of the embodiments of the present invention described herein. In the context of the present application, the term "furnace" refers to the elements or means for providing heating, while the term "furnace chamber" refers to the area or region in which the furnace and possibly the load compartment and any article are located.

As illustrated in FIG. 1, the furnace chamber 18 may not occupy the whole inner space of the pressure vessel 2, but may leave an intermediate space 10 of the interior of the pressure vessel 2 around the furnace chamber 18. The intermediate space 10 forms a pressure medium guiding passage 10. During operation of the pressing arrangement 100, the temperature in the intermediate space 10 may be lower than the temperature in the furnace chamber 18, but the intermediate space 10 and the furnace chamber 18 may be at equal, or substantially equal, pressure.

The outer surface of the outer walls of the pressure cylinder 1 may be provided with channels, conduits or tubes, etc. (not shown in FIGS. 1 and 2), which channels, conduits or tubes for example may be arranged so as to be in connection with the outer surface of the outer walls of the pressure cylinder 1 and may be arranged to run parallel to an axial direction of the pressure cylinder 1. A coolant for cooling of the walls of the pressure cylinder 1 may be provided in the channels, conduits or tubes, whereby the walls of the pressure cylinder 1 may be cooled in order to protect the walls from detrimental heat building up during operation of the pressure cylinder 1. The coolant in the channels, conduits or tubes may for example comprise water, but another or other types of coolants are possible. The above-mentioned channels, conduits or tubes, etc. may be used in one or more other embodiments of the present invention, such as in any one of the embodiments described herein with reference to FIGS. 5 to 8.

On the outside surface of the outer walls of the pressure cylinder 1, and possibly on any channels, conduits and/or tubes, etc. for coolant as described it the foregoing, pre-stressing means may be provided. The pre-stressing means (not shown in FIGS. 1 and 2) may for example be provided in the form of wires (e.g., made of steel) wound in a plurality of turns so as to form one or more bands, and preferably in several layers, around the outside surface of the outer walls of the pressure cylinder 1 and possibly also any channels, conduits and/or tubes, etc. for coolant that may be provided thereon. The pre-stressing means may be arranged for exerting radial compressive forces on the pressure cylinder 1. Such pre-stressing means may be used in one or more other embodiments of the present invention, such as in any one of the embodiments described herein with reference to FIGS. 5 to 8.

Even though it is not explicitly indicated in any of FIGS. 1 and 2, the pressure vessel 2 may be arranged such that it can be opened and closed, such that any article within the pressure vessel 2 may be inserted or removed. An arrangement of the pressure vessel 2 such that it can be opened and closed may be realized in a number of different manners, as known in the art. Although not explicitly indicated in FIGS. 1 and 2, the top end closure 3 may be arranged so that it can be opened and closed. The bottom end portion 4 could possibly be arranged so that it could be opened and closed.

The furnace chamber 18 is at least in part surrounded by a heat insulated casing 6, 7, 17. In accordance with the embodiment of the present invention illustrated in FIG. 1, the heat insulated casing 6, 7, 17 comprises a heat insulating portion 7, a housing 6 which is partly enclosing the heat insulating portion 7, and a bottom insulating portion 17. Although the heat insulated casing is collectively referred to by the reference numerals 6, 7, 17, not all of the elements of the heat insulated casing 6, 7, 17 may be arranged so as to be heat insulated or heat insulating. For example, the housing 6 may not be arranged so as to be heat insulated or heat insulating.

The furnace chamber 18 comprises a load compartment 19 arranged within the furnace chamber 18, which load compartment 19 is configured to hold at least one article to be treated (not shown in FIGS. 1 and 2). The furnace chamber 18 is arranged so as to allow for a flow of pressure medium through the load compartment 19. The furnace chamber 18 comprises a pressure medium guiding passage 12—or possibly several pressure medium guiding passages—that is or are in part formed between the heat insulated casing 6, 7, 17 and the load compartment 19, as illustrated in FIGS. 1 and 2. The pressure medium guiding passage 12 is in fluid communication with the load compartment 19 so as to form an inner convection loop of the furnace chamber 18. The inner convection loop of the furnace chamber 18 is arranged such that pressure medium in the inner convection loop can be guided through the load compartment 19 and through the pressure medium guiding passage 12 of the furnace chamber 18 and back to the load compartment 19, or vice versa.

According to the embodiment of the present invention illustrated in FIGS. 1 and 2, the furnace 36 is arranged in a part of the pressure medium guiding passage 12. It is however to be understood that the position of furnace 36 in the pressure medium guiding passage 12 is according to an example, and, as indicated in the foregoing, different configurations and arrangements of the furnace 36 in relation to, e.g., within, the furnace chamber 18 are possible.

A pressure medium guiding passage 11 is formed between the heat insulating portion 7 and the housing 6. As illustrated in FIG. 1, the pressure medium guiding passages 10 and 11 are in fluid communication with the furnace chamber 18 and are arranged to form at least a part of an outer cooling loop within the pressure vessel 2. An exemplifying flow of pressure medium during a cooling phase of a treatment cycle is illustrated by the arrows within the pressure vessel 2 shown in FIG. 1. A part of the outer cooling loop comprises the pressure medium guiding passage 11 formed between portions of the housing 6 and the heat insulating portion 7, respectively. The pressure medium guiding passage 11 is arranged to guide the pressure medium after having exited the furnace chamber 18 towards the top end closure 3 to a space between the top end closure 3 and the furnace chamber 18 in which a heat absorbing element 40 may be arranged, as illustrated in FIGS. 1 and 2.

The pressure medium may enter the heat absorbing element 40 via inlets or openings 41 at a first side 44 of the heat absorbing element 40. The heat absorbing element 40 is configured so as to permit pressure medium to be guided through the heat absorbing element 40 towards a plurality of outlets or openings 43 of the heat absorbing element 40 at a second side 45 of the heat absorbing element 40, via which plurality of outlets or openings 43 the pressure medium may exit the heat absorbing element 40. As illustrated in FIGS. 1 and 2, the first side 44 of the heat absorbing element 40 and the second side 45 of the heat absorbing element 40 may for example be opposite sides of the heat absorbing element 40. It is to be understood that it is not necessary to have a plurality of inlets 41 and a plurality of outlets 43. Possibly, there could be only one inlet 41 on the first side 44 of the heat absorbing element 40, and there could possibly be only one outlet 43 on the second side 45 of the heat absorbing element 40.

The heat absorbing element 40 may for example be arranged so as to comprise a plurality of pressure medium guiding channels (not shown in FIGS. 1 and 2) within the heat absorbing element 40. The plurality of pressure medium guiding channels may be arranged to guide pressure medium having entered into the heat absorbing element 40 within the interior thereof towards or to the outlets or openings 43 of the heat absorbing element 40. Other configurations of the heat absorbing element 40 are possible. In alternative or in addition, the interior of the heat absorbing element 40 could for example include one or more heat accumulating elements, such as, for example, a plurality of spheres made of metal or another material having a relatively high thermal conductivity (not shown in FIGS. 1 and 2). In alternative or in addition, the interior of the heat absorbing element 40 could include a porous structure (not shown in FIGS. 1 and 2) of a material having a relatively high thermal conductivity. For example, the interior of the heat absorbing element 40 could possibly include a metal foam, e.g., a so called open foam, having interconnected pores.

The heat absorbing element 40 may be suspended or arranged within the space between the top end closure 3 and the furnace chamber 18 for example by means of one or more supporting structures (not shown in FIGS. 1 and 2), which supporting structure(s) for example may be attached to the housing 6 and/or to the heat insulating portion 7.

As best illustrated in FIG. 1, the pressure medium may exit the load compartment 19 and subsequently be guided in a part of the pressure medium guiding passage 12 between the walls of the load compartment 19 and the heat insulating portion 7, after which the pressure medium may enter into the pressure medium guiding passage 11 by way of openings between the heat insulating portion 7 and the housing 6. The openings between the heat insulating portion 7 and the housing 6 may possibly be provided with valves or any other type of pressure medium flow restriction means. Pressure medium exiting the heat absorbing element 40 may be guided via (at least) an opening in the portion of the housing 6 to a pressure medium guiding passage defined by the space in part defined by the inner surface of the top end closure 3 and the pressure medium guiding passage 10.

It is to be understood that the heat absorbing element 40 is optional and may be omitted, wherein pressure medium guided in the pressure medium guiding passage 11 towards the top end closure 3 may exit the pressure medium guiding passage 11 via (at least) an opening in the portion of the housing 6 to a pressure medium guiding passage defined by the space in part defined by the inner surface of the top end closure 3 and the pressure medium guiding passage 10.

Another part of the outer cooling loop comprises the pressure medium guiding passage defined by a space in part defined by the inner surface of the top end closure 3 (e.g., below the top end closure 3), and the pressure medium guiding passage 10. The pressure medium guiding passage defined by the space in part defined by the inner surface of the top end closure 3 and the pressure medium guiding passage 10 are arranged to guide the pressure medium having exited the heat absorbing element 40 in proximity to the top end closure 3 and in proximity to an inner surface of walls of the pressure vessel 2 (e.g., the walls of the pressure cylinder 1, respectively, as illustrated in FIGS. 1 and 2) before the pressure medium re-enters into the furnace chamber 18. Thus, in the other part of the outer cooling loop, the pressure medium is guided in proximity to the inner surface of the top end closure 3 and the inner surface of walls of the pressure cylinder 1. The amount of thermal energy which may be transferred from the pressure medium during its passage in proximity to inner surfaces of the top end closure 3 and the inner surface of walls of the pressure cylinder 1 may depend on at least one of the following: the speed of the pressure medium, the amount of pressure medium having (direct) contact with the inner surface of the top end closure 3 and with the inner surface of walls of the pressure cylinder 1, the relative temperature difference between the pressure medium and the inner surface of the top end closure 3 and the inner surface of walls of the pressure cylinder 1, the thickness of the top end closure 3 and the thickness of the pressure cylinder 1, and the temperature of any flow of coolant in channels, conduits or tubes provided on the outer surface of walls of the pressure cylinder 1.

An exemplifying flow of pressure medium during a heating phase of a treatment cycle is illustrated by the arrows within the pressure vessel 2 shown in FIG. 2. As illustrated in FIG. 2, during a heating phase of a treatment cycle there may be a downward flow of pressure medium through the load compartment 19, in a direction indicated by the generally downwardly pointing arrows in the load compartment 19 in FIG. 2. And as illustrated in FIG. 1, during a cooling phase of a treatment cycle there may be an upward flow of pressure medium through the load compartment 19, in a direction indicated by the upwardly pointing arrows in the load compartment 19 in FIG. 1.

As described in the foregoing, the furnace chamber 18 comprises a pressure medium guiding passage 12 that is in part formed between the heat insulated casing 6, 7, 17 and the load compartment 19 and is in fluid communication with the load compartment 19 so as to form an inner convection loop of the furnace chamber 18. As described in the foregoing, the inner convection loop of the furnace chamber 18 is arranged such that pressure medium in the inner convection loop can be guided through the load compartment 19 and through the pressure medium guiding passage 12 of the furnace chamber 18 and back to the load compartment 19, or vice versa, whereby a circulating flow of pressure medium in the inner convection loop can be achieved.

The pressure vessel 2 comprises an adjustable throttle 15 configured to selectively impede or obstruct pressure medium flow in at least a portion of the pressure medium guiding passage 12 of the furnace chamber 18. For example, the adjustable throttle 15 may be configured to selectively impede or obstruct pressure medium flow in at least a portion of the pressure medium guiding passage 12 of the furnace chamber 18 so as to selectively impede or obstruct a circulating flow of pressure medium in the inner convection loop of the furnace chamber 18.

The pressure vessel 2 comprises a flow generator 16 configured to selectively generate a flow of pressure medium into the load compartment 19 by transportation of pressure medium from a space 5 and injection of the pressure medium into the load compartment 19. The space 5 is located between the bottom insulating portion 17 of the pressure vessel 2 and the bottom end portion 4 of the pressure vessel 2. According to the embodiment of the present invention illustrated in FIGS. 1 and 2, the flow generator 16 comprises an ejector arrangement 16, which is schematically illustrated in FIGS. 1 and 2. As best illustrated in FIG. 1, pressure medium from the pressure medium guiding passage 10 which enters the space 5 may be drawn into the flow generator 16 and subsequently be ejected from the flow generator 16 into a pressure medium conduit 20, 21, 22. The pressure medium conduit 20, 21, 22 has an inlet 21 arranged within the space 5, an intermediate portion 20 coupled to the inlet 21, and an outlet 22 coupled to the intermediate portion 20. In accordance with the embodiment of the present invention illustrated in FIGS. 1 and 2, the pressure medium conduit 20, 21, 22 is provided with a pressure medium distribution conduit 8 at the outlet 22 of the pressure medium conduit 20, 21, 22 for injecting the pressure medium transported from the space 5 into the load compartment 19. The pressure medium distribution conduit 8 may be configured to diffuse the pressure medium which is output from the pressure medium conduit 20, 21, 22 via its outlet 22 into the load compartment 19 of the furnace chamber 18. Thus, the pressure medium distribution conduit 8 may in accordance with one or more embodiments of the present invention be referred to as a diffusor. As illustrated in FIGS. 1 and 2, the intermediate portion 20 may extend into the load compartment 19 such that the outlet 22 is located within the load compartment 19.

The flow generator 16—for example comprising an ejector arrangement 16—may comprise a single stage ejector, or a multi-stage ejector (e.g., a two-stage ejector). By a single-stage ejector, it is meant that the flow generator 16 or ejector arrangement 16 comprises one flow generator or ejector. By a multi-stage ejector, it is meant that the flow generator 16 or ejector arrangement 16 comprises a plurality of flow generators or ejectors, which are arranged so that the output from at least one flow generator or ejector is input to another flow generator or ejector. The plurality of flow generators or ejectors may for example be arranged in series. For example, the flow generator 16 or ejector arrangement 16 may comprise a primary flow generator or ejector and a secondary flow generator or ejector, wherein the primary flow generator or ejector is arranged to draw pressure medium from the pressure medium guiding passage 10 which enters the space 5 into the primary flow generator or ejector. The output from the primary flow generator or ejector may be input into the secondary flow generator or ejector, and the output from the secondary flow generator or ejector may be ejected into the pressure medium conduit 20, 21, 22.

In alternative or in addition, the flow generator 16 could for example comprise one or more fans, pumps, or the like, which may be arranged to cause a flow of pressure medium into the pressure medium conduit 20, 21, 22.

As best illustrated in FIG. 1, for example during a cooling phase of a treatment cycle, there may be a pressure medium flow path of flow of pressure medium into the load compartment 19, generated by transportation of pressure medium from the space 5. And as perhaps best illustrated in FIG. 2, for example during a heating phase of a treatment cycle, there may be established a pressure medium flow path of the pressure medium guiding passage 12 of the furnace chamber 18. The pressure medium flow path of flow of pressure medium into the load compartment 19, generated by transportation of pressure medium from the space 5, and the pressure medium flow path of the pressure medium guiding passage 12 of the furnace chamber 18 may, as illustrated in FIGS. 1 and 2, intersect at a pressure medium flow path intersection 14. In accordance with the embodiment of the present invention illustrated in FIGS. 1 and 2, the adjustable throttle 15 may for example be arranged at the pressure medium flow path intersection 14. It is to be understood that the position of the pressure medium flow path intersection 14 illustrated in FIGS. 1 and 2 is according to an example and that the pressure medium flow path intersection 14 could be located at a position in the pressure vessel 2 different from the position illustrated in FIGS. 1 and 2.

Figure 3:
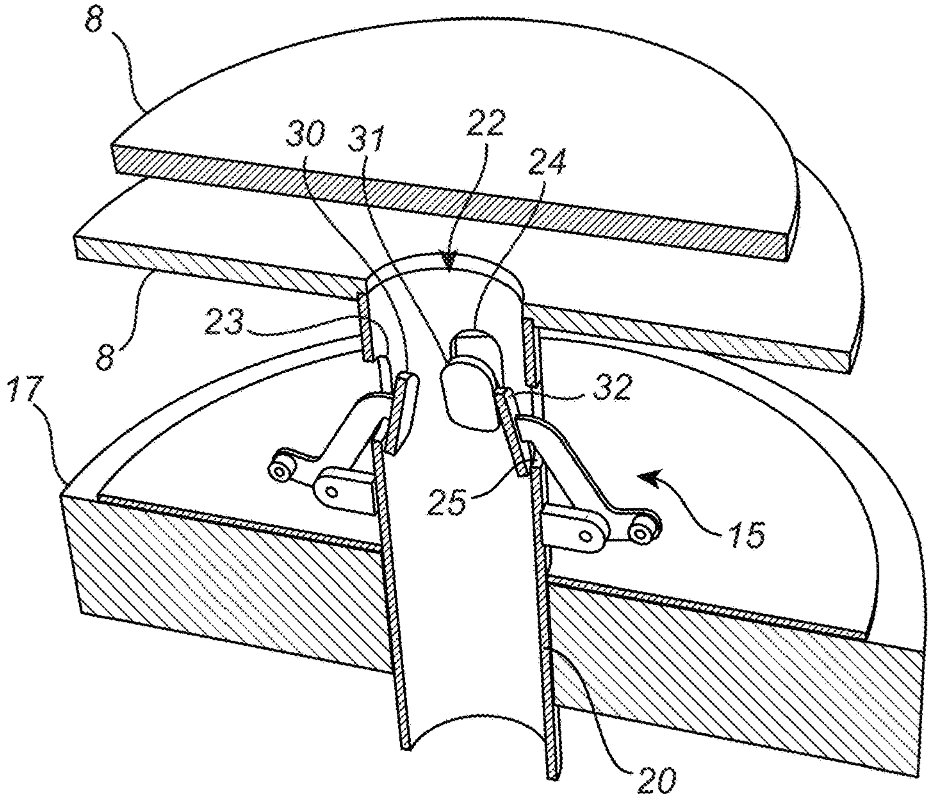
FIG. 3 is a schematic, in part sectional, side view of a portion of a pressing arrangement according to an embodiment of the present invention.

In accordance with the embodiment of the present invention illustrated in FIGS. 1 and 2, the pressure medium conduit 20, 21, 22 may comprise a plurality of openings therein, which openings may be arranged between the outlet 22 and the bottom insulating portion 17. The openings are perhaps best illustrated in FIG. 3, which is a schematic, in part sectional, side view of a portion of the pressing arrangement 100 illustrated in FIGS. 1 and 2. FIG. 3 illustrates a portion of the pressure medium conduit 20, 21, 22, including a part of the intermediate portion 20 and the outlet 22. As illustrated in FIG. 3, the pressure medium conduit 20, 21, 22 may comprise a plurality of openings 23, 24, 25 therein. As indicated in FIG. 3, there may be a plurality of openings in the pressure medium conduit 20, 21, 22, which openings are spaced from each other, possibly equidistantly arranged around the circumferential surface of the intermediate portion 20 and possibly at the same or substantially the same height along the axial extension of the pressure medium conduit 20, 21, 22. Thus, only some of the openings in the pressure medium conduit 20, 21, 22 may be shown in FIG. 3.

With further reference to FIGS. 1 and 2, the pressure vessel 2 comprises an adjustable throttle 15 configured to selectively impede or obstruct pressure medium flow in at least a portion of the pressure medium guiding passage 12 of the furnace chamber 18, thereby selectively impeding or obstructing a flow of pressure medium in at least a portion of the inner convection loop of the furnace chamber 18. For example, the adjustable throttle 15 may be configured to selectively impede or obstruct pressure medium flow in at least a portion of the pressure medium guiding passage 12 of the furnace chamber 18 so as to selectively impede or obstruct a circulating flow of pressure medium in the inner convection loop of the furnace chamber 18.

FIG. 3 illustrates the adjustable throttle 15 in accordance with an exemplifying embodiment of the present invention. The adjustable throttle 15 illustrated in FIG. 3 is configured to selectively impede or obstruct pressure medium flow through the openings 23, 24, 25 in the pressure medium conduit 20, 21, 22. The adjustable throttle 15 comprises a plurality of movable throttle bodies 30, 31, 32 which are arranged so as to selectively impede or obstruct pressure medium flow through respective ones of the openings 23, 24, 25 in the pressure medium conduit 20, 21, 22. As illustrated in FIG. 3, the throttle body 30 is arranged so as to selectively impede or obstruct pressure medium flow through the opening 23, the throttle body 31 is arranged so as to selectively impede or obstruct pressure medium flow through the opening 24, and the throttle body 32 is arranged so as to selectively impede or obstruct pressure medium flow through the opening 25. Each of the throttle bodies 30, 31, 32 may be movable at least between a position in which the throttle body 30, 31, 32 closes the corresponding opening 23, 24, 25, so as to obstruct pressure medium flow through the respective opening 23, 24, 25, and a position in which the throttle body 30, 31, 32 is spaced from the respective opening 23, 24, 25 (this position is illustrated in FIG. 3), so as to not impede or obstruct pressure medium flow through the respective opening 23, 24, 25.

As illustrated in FIG. 3, each of the throttle bodies 30, 31, 32 may have a shape corresponding to the respective ones of the openings 23, 24, 25. Each of the throttle bodies 30, 31, 32 may for example be pivotally arranged within the pressure medium conduit 20, 21, 22 or outside the pressure medium conduit 20, 21, 22. Furthermore, each of the throttle bodies 30, 31, 32 may be arranged so as to be pivotally movable between the position in which the throttle body 30, 31, 32 closes the respective opening 23, 24, 25 and the position in which the throttle body 30, 31, 32 is spaced from the respective opening 23, 24, 25, by pivoting the throttle body 30, 31, 32 so as not be over or in the respective opening 23, 24, 25.

As illustrated in FIG. 3, each of the throttle bodies 30, 31, 32 may be arranged within the pressure medium conduit 20, 21, 22. For example, each of the throttle bodies 30, 31, 32 may be arranged so that it is located within the pressure medium conduit 20, 21, 22 when the throttle body 30, 31, 32 is in the position in which it is spaced from the respective opening 23, 24, 25 so as to not impede or obstruct pressure medium flow therethrough. However, this is not required, and in accordance with one or more embodiments of the present invention, each of the throttle bodies 30, 31, 32 could be arranged outside the pressure medium conduit 20, 21, 22, so that each of the throttle bodies 30, 31, 32 is arranged so that it is located outside the pressure medium conduit 20, 21, 22 when the throttle body 30, 31, 32 is in the position in which it is spaced from the respective opening 23, 24, 25 so as to not impede or obstruct pressure medium flow therethrough.

The adjustable throttle 15 may for example be arranged such that it can be actuated based on any pressure difference between the pressure in the pressure medium conduit 20, 21, 22 and the pressure on the outside of the pressure medium conduit 20, 21, 22, for example at the openings 23, 24, 25. The adjustable throttle 15 may for example be configured such that if there is a higher pressure within the pressure medium conduit 20, 21, 22 as compared to on the outside of the pressure medium conduit 20, 21, 22, then the adjustable throttle 15 impedes or obstructs pressure medium flow through the openings 23, 24, 25, and otherwise the adjustable throttle 15 may not impede or obstruct pressure medium flow through the openings 23, 24, 25. The adjustable throttle 15—and in particular the throttle bodies 30, 31, 32 thereof—may hence be self-adjusting, or 'self-balanced', based on pressure. Thus, the adjustable throttle 15 may for example be actuated responsive to an overpressure condition within the pressure medium conduit 20, 21, 22, so that it impedes or obstructs pressure medium flow through the openings 23, 24, 25.

In alternative or in addition, the adjustable throttle 15 may be arranged such that it is controllable with respect to impeding or obstructing pressure medium flow in at least a portion of the pressure medium guiding passage 12 of the furnace chamber 18.

With further reference to FIGS. 1 and 2, the pressing arrangement 100 may comprise a control unit, schematically indicated by the element 9 in FIGS. 1 and 2. The control unit 9 may be communicatively coupled to the adjustable throttle 15 for controlling the adjustable throttle 15 so as to controllably impede or obstruct pressure medium flow in at least a portion of the pressure medium guiding passage 12 of the furnace chamber 18. To that end, the pressing arrangement 100 may comprise—or the adjustable throttle 15 may be provided with—an actuating mechanism or system (not shown in FIGS. 1 and 2) by means of which the adjustable throttle 15 may be controlled so as to controllably impede or obstruct pressure medium flow in at least a portion of the pressure medium guiding passage 12 of the furnace chamber 18. The actuating mechanism or system may for example be a pneumatic actuating mechanism or system. The communicative coupling between the control unit 9 and the adjustable throttle 15 (and/or the actuating mechanism or system) may be realized or implemented for example by means of any appropriate wired and/or wireless communication means or techniques as known in the art. The control unit 9 may be configured to control the adjustable throttle 15 so as to controllably impede or obstruct pressure medium flow in at least a portion of the pressure medium guiding passage 12 of the furnace chamber 18 based on the flow level of any flow of pressure medium into the load compartment 19 that is generated by transportation of pressure medium upwards from the space 5 and which flow is incident or impinges on the adjustable throttle 15. To this end, the control unit 9 may be communicatively coupled with a pressure medium flow sensor (not shown in FIGS. 1 and 2) for sensing the flow level of any flow of pressure medium into the load compartment 19 that is generated by transportation of pressure medium upwards from the space 5.

As described in the foregoing, the pressing arrangement 100 is configured to treat at least one article by means of hot pressing, for example such that the treatment of the at least one article comprises at least one heating phase, in which the at least one article is heated, and at least one cooling phase, in which the at least one article is cooled. FIG. 1 illustrates the pressing arrangement 100 during a cooling phase, and FIG. 2 illustrates the pressing arrangement 100 during a heating phase. The control unit 9 may be configured to control the adjustable throttle so as to impede or obstruct pressure medium flow in at least a portion of the pressure medium guiding passage 12 of the furnace chamber 18 during the cooling phase, possibly so as to impede or obstruct a circulating pressure medium flow in the inner convection loop of the furnace chamber 18, and so as to not impede or obstruct pressure medium flow in at least a portion of the at least one pressure medium guiding passage 12 of the furnace chamber 18 during the heating phase, possibly so as to not impede or obstruct a circulating pressure medium flow in the inner convection loop of the furnace chamber 18. Thus, during the heating phase, the adjustable throttle 15 may be controlled so as to 'open' the inner convection loop of the furnace chamber 18, so as to allow for a circulating pressure medium flow in the inner convection loop, while during the cooling phase, the adjustable throttle 15 may be controlled so as to 'close' the inner convection loop of the furnace chamber 18, so as to not allow for a circulating pressure medium flow in the inner convection loop, or only allow for a relatively small circulating pressure medium flow in the inner convection loop.

It is to be understood that an adjustable throttle 15 which comprises a plurality of movable throttle bodies 30, 31, 32 such as illustrated in FIG. 3—and also in FIGS. 1 and 2—is according to an example, and that the adjustable throttle 15 may be implemented in other ways.

Figure 4:
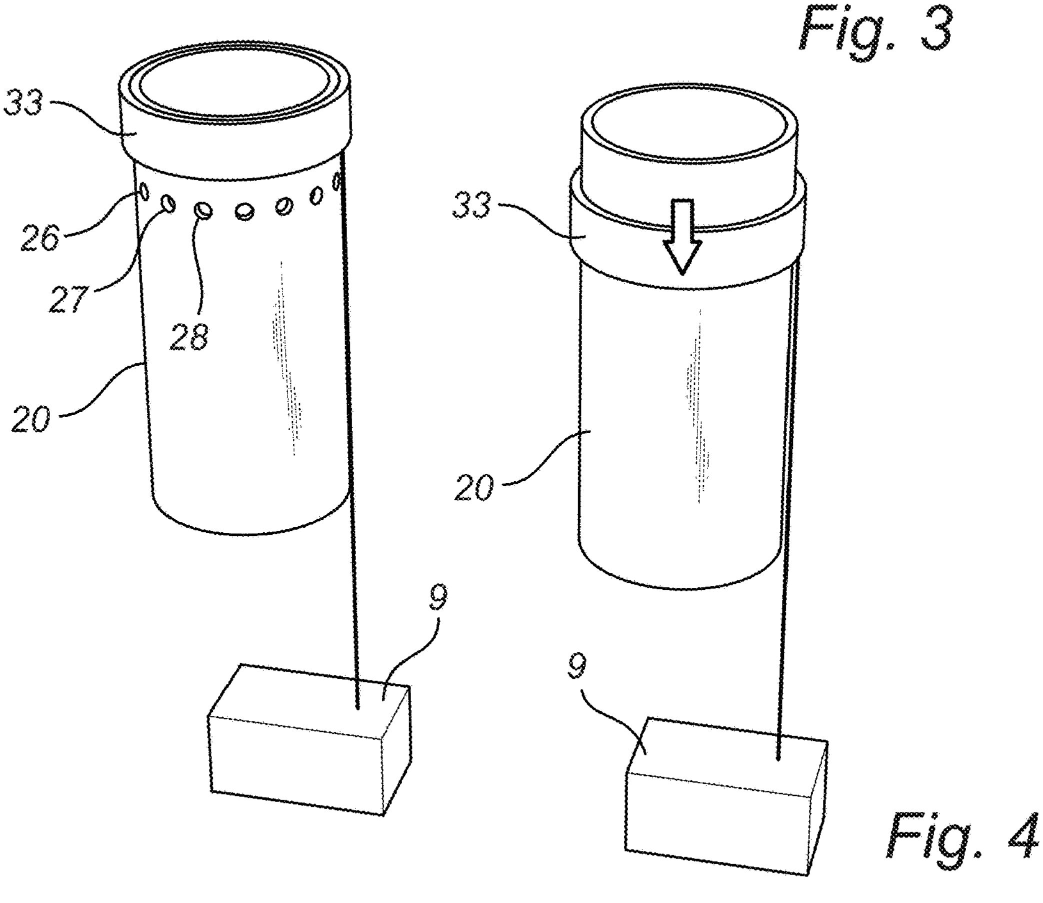
FIG. 4 are schematic views of a pressure medium conduit in a pressing arrangement in accordance with an embodiment of the present invention.

FIG. 4 are schematic views of a pressure medium conduit in a pressing arrangement in accordance with an embodiment of the present invention. The pressure medium conduit illustrated in FIG. 4 is similar to the pressure medium conduit 20, 21, 22 illustrated in FIGS. 1 to 3, and the pressure medium conduit illustrated in FIG. 4 could be located in the same or substantially the same position in the pressure vessel 2 as the pressure medium conduit 20, 21, 22 illustrated in FIGS. 1 to 3.

The pressure medium conduit illustrated in FIG. 4 comprises an intermediate portion 20 similar to the intermediate portion 20 of the pressure medium conduit 20, 21, 22 illustrated in FIGS. 1 to 3. The intermediate portion 20 of the pressure medium conduit illustrated in FIG. 4 comprises a plurality of openings 26, 27, 28, which possibly may be located at the same or substantially the same height along the axial extension of the pressure medium conduit, such as illustrated in FIG. 4. Only some of the openings 26, 27, 28 in the pressure medium conduit are indicated by reference numerals in FIG. 4.

In accordance with the embodiment of the present invention illustrated in FIG. 4, the adjustable throttle comprises a throttle body 33 which is slidably arranged on the outside of the pressure medium conduit, and particularly on the outside of the intermediate portion 20 thereof. The throttle body 33 is movable between a position illustrated on the right-hand side of FIG. 4, in which the throttle body 33 closes the openings 26, 27, 28 in the pressure medium conduit by sliding the throttle body 33 over the outside of the pressure medium conduit so that the throttle body 33 overlies the openings 26, 27, 28 in the pressure medium conduit, thereby obstructing pressure medium flow through the openings 26, 27, 28, and a position illustrated on the left-hand side of FIG. 4, in which the throttle body 33 is spaced from the openings 26, 27, 28 (e.g., along the axial extension of the pressure medium conduit, as illustrated in FIG. 4) by sliding the throttle body 33 over the outside of the pressure medium conduit so that the throttle body 33 does not overlie the openings 26, 27, 28, whereby pressure medium flow through the openings 26, 27, 28 is not impeded or obstructed by the throttle body 33. It is to be understood that throttle body 33 must not necessarily be slidably arranged on the outside of the pressure medium conduit, but that it alternatively could be slidably arranged on the inside of the pressure medium conduit.

As illustrated in FIG. 4, the pressing arrangement may comprise a control unit 9 that may be communicatively coupled to the adjustable throttle, e.g., to the throttle body 33, for controlling the throttle body 33 so as to be moved between the position illustrated on the right-hand side of FIG. 4 and the position illustrated on the left-hand side of FIG. 4 (not shown in FIG. 4). To that end, the pressing arrangement may comprise an actuating mechanism or system communicatively coupled with control unit 9 and by means of which the adjustable throttle or throttle body 33 may be moved between the position illustrated on the right-hand side of FIG. 4 and the position illustrated on the left-hand side of FIG. 4.

Figure 5:
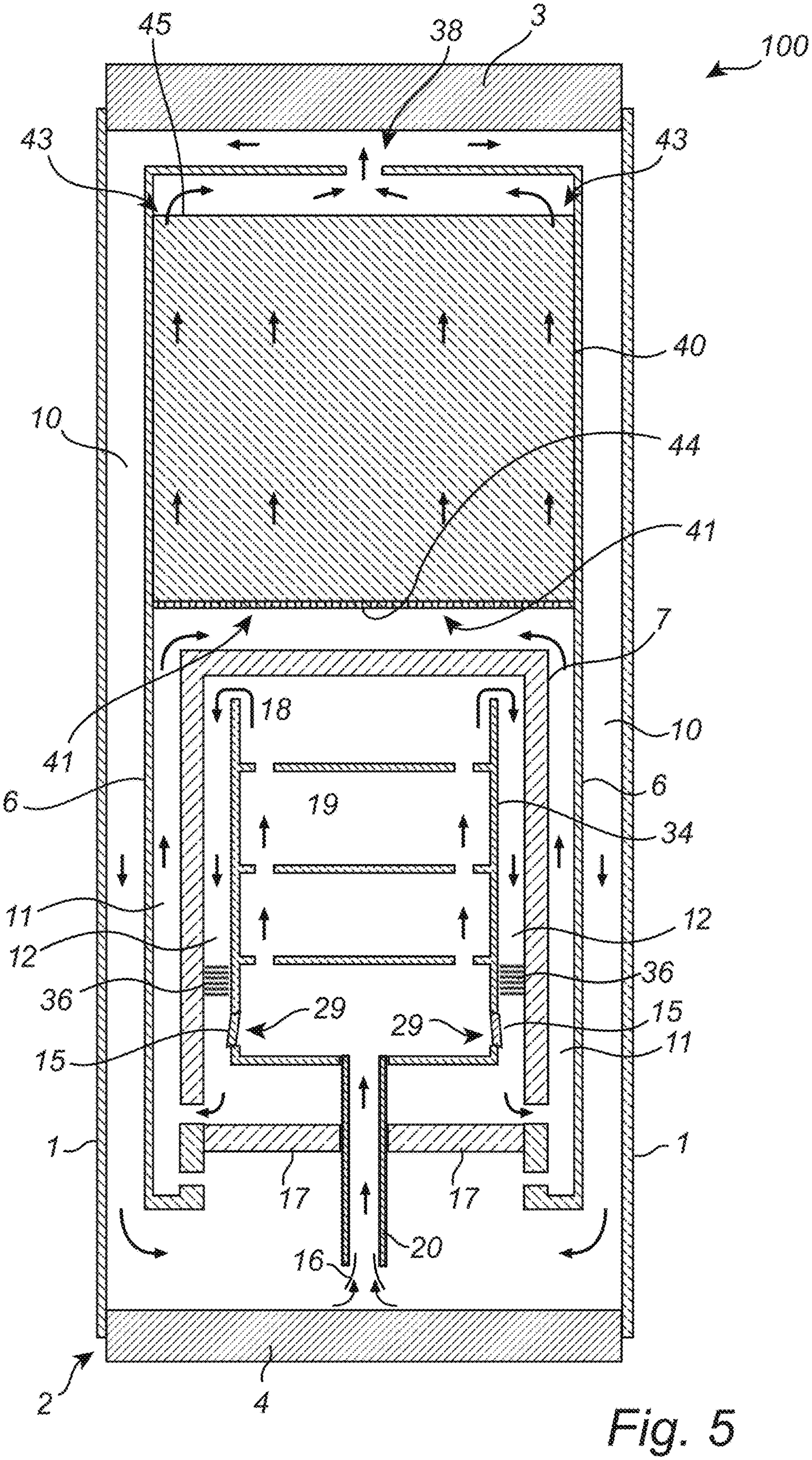
FIGS. 5 and 6 are schematic, in part sectional, side views of a pressing arrangement according to an embodiment of the present invention.
Figure 6:
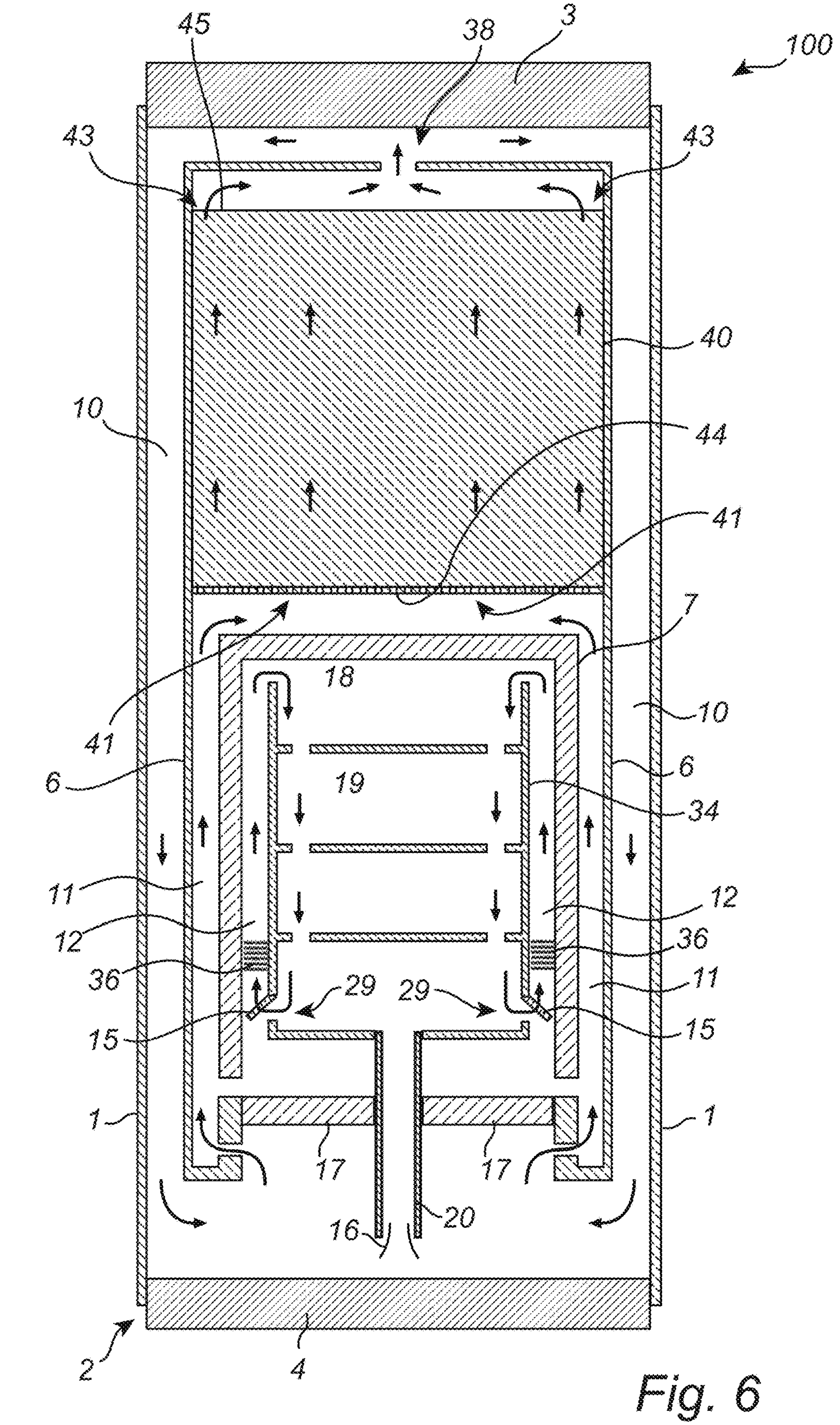

FIGS. 5 and 6 are schematic, in part sectional, side views of a pressing arrangement 100 according to another embodiment of the present invention. The pressing arrangement 100 illustrated in FIGS. 5 and 6 is similar to the pressing arrangement 100 illustrated in FIGS. 1 and 2, and the same reference numerals in FIGS. 1 and 2 and in FIGS. 5 and 6 indicate the same or similar components, having the same or similar function.

The pressing arrangement 100 illustrated in FIGS. 5 and 6 is configured to treat at least one article (not shown in FIGS. 5 and 6) by means of hot pressing, such that the treatment of the at least one article comprises at least one heating phase, in which the at least one article is heated, and at least one cooling phase, in which the at least one article is cooled. FIG. 5 illustrates the pressing arrangement 100 during a cooling phase, and FIG. 6 illustrates the pressing arrangement 100 during a heating phase. An exemplifying flow of pressure medium during a cooling phase of a treatment cycle is illustrated by the arrows within the pressure vessel 2 shown in FIG. 5, and an exemplifying flow of pressure medium during a heating phase of a treatment cycle is illustrated by the arrows within the pressure vessel 2 shown in FIG. 6. As illustrated in FIGS. 5 and 6, during a heating phase of a treatment cycle there may be a downward flow of pressure medium through the load compartment 19, in a direction indicated by the downwardly pointing arrows in the load compartment 19 in FIG. 6, and during a cooling phase of a treatment cycle there may be an upward flow of pressure medium through the load compartment 19, in a direction indicated by the upwardly pointing arrows in the load compartment 19 in FIG. 5.

In the pressing arrangement 100 illustrated in FIGS. 5 and 6, the load compartment 19 comprises openings 29 in a side wall of the load compartment 19. In accordance with the embodiment of the present invention illustrated in FIGS. 5 and 6, the load compartment 19 is defined by a load basket 34 that is configured to hold at least one article to be treated, wherein the openings 29 are constituted by openings 29 in a side wall of the load basket 34. The openings 29 permit pressure medium from the pressure medium guiding passage 12 of the furnace chamber 18 to enter the load compartment 19, or vice versa. Thereby, the openings 29 may constitute a part of the inner convection loop of the furnace chamber 18. The pressure vessel 2 comprises adjustable throttles 15, each including a valve 15 (or several valves). The valves 15 are arranged in the openings 29 and are configured to selectively impede or obstruct pressure medium flow through the openings 29.

As illustrated in FIG. 5, during a cooling phase of the treatment cycle, the valves 15 may be closed so as to obstruct or impede pressure medium flow through the openings 29. Thereby, during a cooling phase of the treatment cycle, a circulating pressure medium flow in the inner convection loop of the furnace chamber 18 may be obstructed, so that the inner convection loop of the furnace chamber 18 is 'closed'.

As illustrated in FIG. 6, during a heating phase of the treatment cycle, the valves 15 may be open so as to not obstruct or impede pressure medium flow through the openings 29. Thereby, during a heating phase of the treatment cycle, a circulating pressure medium flow in the inner convection loop of the furnace chamber 18 may not be obstructed or impeded, so that the inner convection loop of the furnace chamber 18 is 'open'.

The pressing arrangement may comprise a control unit (not shown in FIGS. 5 and 6) which may be communicatively coupled to the adjustable throttles 15 including the valves 15 for controlling the valves 15 so as to be closed, such as illustrated in FIG. 5, or so as to be open, such as illustrated in FIG. 6. To that end, the pressing arrangement may comprise an actuating mechanism or system communicatively coupled with control unit and by means of which the valves 15 may be opened or closed. For example, the control unit may be configured to control the valves 15 such that the valves 15 are closed during a cooling phase of the treatment cycle and such that the valves 15 are open during a heating phase of the treatment cycle.

Figure 8:
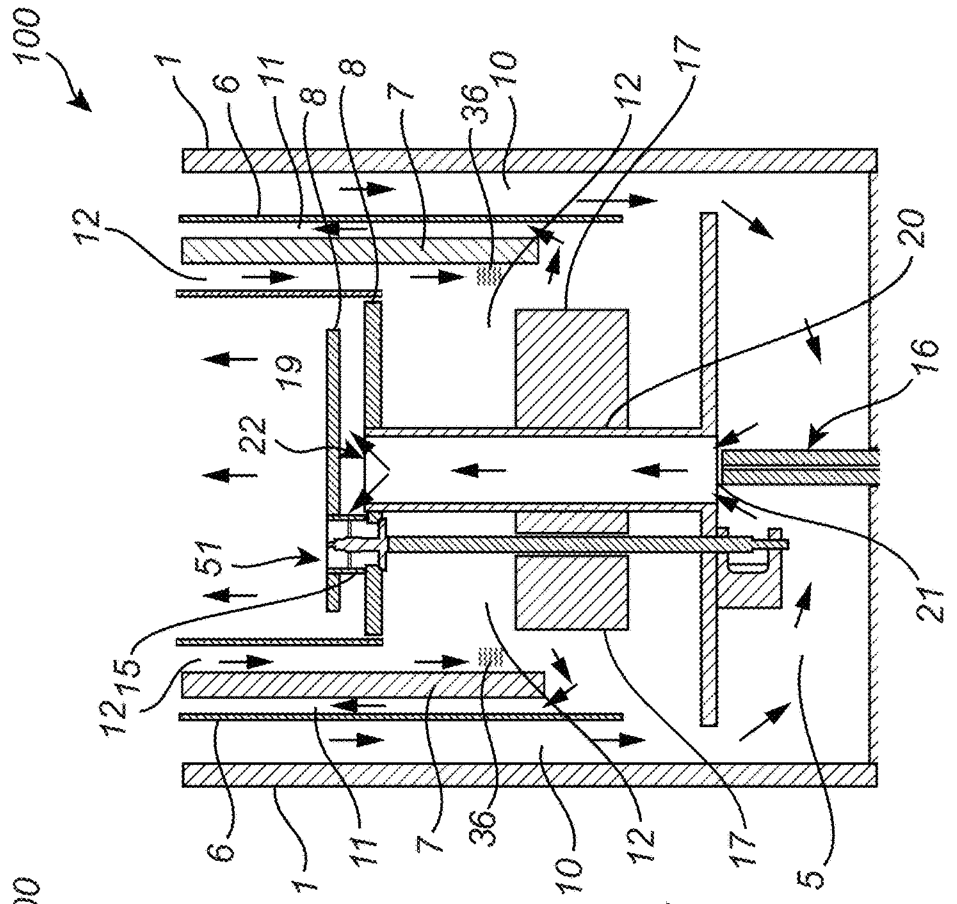
FIGS. 7 and 8 are schematic, in part sectional, side views of a portion of a pressing arrangement according to an embodiment of the present invention.
Figure 7:
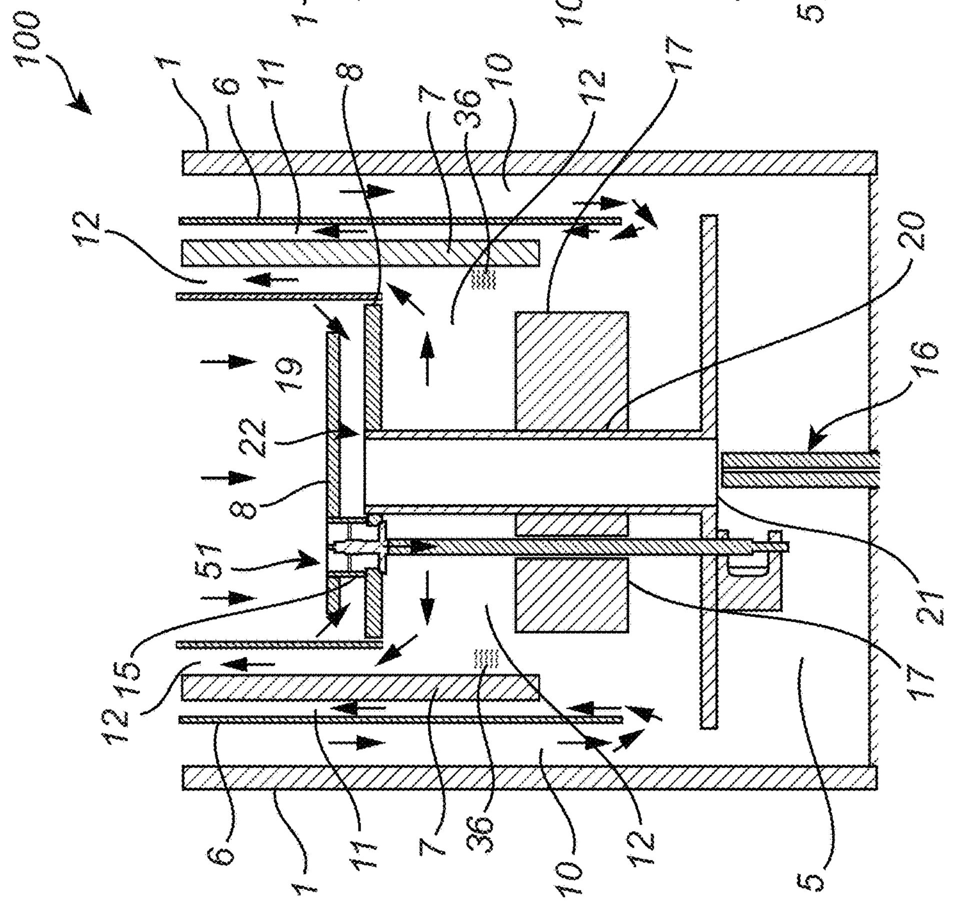

As illustrated in FIGS. 1 and 2 and in FIGS. 5 and 6, the adjustable throttle may be located at different positions in the pressure vessel 2. Another example of where the adjustable throttle may be located in the pressure vessel 2 is illustrated in FIGS. 7 and 8, which are schematic, in part sectional, side views of a portion of a pressing arrangement 100 according to another embodiment of the present invention. The pressing arrangement 100 illustrated in FIGS. 7 and 8 is similar to the pressing arrangement 100 illustrated in FIGS. 1 and 2, and the same reference numerals in FIGS. 1 and 2 and in FIGS. 7 and 8 indicate the same or similar components, having the same or similar function.

The pressing arrangement 100 illustrated in FIGS. 7 and 8 is configured to treat at least one article (not shown in FIGS. 7 and 8) by means of hot pressing, for example such that the treatment of the at least one article comprises at least one heating phase, in which the at least one article is heated, and at least one cooling phase, in which the at least one article is cooled. FIG. 7 illustrates the pressing arrangement 100 during a heating phase, and FIG. 8 illustrates the pressing arrangement 100 during a cooling phase. An exemplifying flow of pressure medium during a heating phase of a treatment cycle is illustrated by the arrows within the pressure vessel shown in FIG. 7, and an exemplifying flow of pressure medium during a cooling phase of a treatment cycle is illustrated by the arrows within the pressure vessel shown in FIG. 8. As illustrated in FIGS. 7 and 8, during a heating phase of a treatment cycle there may be a downward flow of pressure medium through the load compartment 19, in a direction indicated by the generally downwardly pointing arrows in the load compartment 19 in FIG. 7, and during a cooling phase of a treatment cycle there may be an upward flow of pressure medium through the load compartment 19, in a direction indicated by the upwardly pointing arrows in the load compartment 19 in FIG. 8.

Similar to the pressing arrangement 100 illustrated in FIGS. 1 and 2, the pressing arrangement 100 illustrated in FIGS. 7 and 8 has a pressure medium conduit 20, 21, 22 that is comprised in the pressure vessel 2. The pressure medium conduit 20, 21, 22 has an inlet 21 that is arranged within the space 5 located below the bottom insulating portion 17 of the pressure vessel 2 and above the bottom end portion of the pressure vessel 2. The pressure medium conduit 20, 21, 22 further has an intermediate portion 20 coupled to the inlet 21 and an outlet 22 coupled to the intermediate portion 20. As illustrated in FIGS. 7 and 8, the intermediate portion 20 may extend into the load compartment 19 such that the outlet 22 is located within the load compartment 19. The pressure medium conduit 20, 21, 22 is provided with a pressure medium distribution conduit 8 at its outlet 22 for injecting the pressure medium transported from the space 5 into the load compartment 19. The pressure medium distribution conduit 8 may be configured to diffuse the pressure medium which is output from the pressure medium conduit 20, 21, 22 via its outlet 22 into the load compartment 19 of the furnace chamber 18. As best illustrated in FIG. 8, pressure medium from the pressure medium guiding passage 10 which enters the space 5 may be drawn into the flow generator 16 and subsequently be ejected from the flow generator 16 into a pressure medium conduit 20, 21, 22.

In accordance with the embodiment of the present invention illustrated in FIGS. 7 and 8, the pressure medium distribution conduit 8 comprises at least one pressure medium guiding passage 51 permitting pressure medium from the at least one pressure medium guiding passage 12 of the furnace chamber 18 to enter the load compartment 19, or vice versa. Even though only one pressure medium guiding passage 51 comprised in the pressure medium distribution conduit 8 is illustrated in FIGS. 7 and 8, it is to be understood that there may be several pressure medium guiding passages comprised in the pressure medium distribution conduit 8, wherein each of the pressure medium guiding passages may permit pressure medium from the at least one pressure medium guiding passage 12 of the furnace chamber 18 to enter the load compartment 19, or vice versa. For example, there may be a plurality of pressure medium guiding passages comprised in the pressure medium distribution conduit 8 which may be distributed, possibly uniformly, in a circumferential direction with respect to a central axis of the pressure medium conduit 20, 21, 22 and/or the pressure medium distribution conduit 8.

The adjustable throttle 15 is configured to selectively impede or obstruct pressure medium flow through the pressure medium guiding passage 51 of the pressure medium distribution conduit 8. In accordance with the embodiment of the present invention illustrated in FIGS. 7 and 8, the adjustable throttle 15 may for example comprise a valve 15 (or several valves). There may possibly be provided several adjustable throttles, wherein each adjustable throttle may be configured to selectively impede or obstruct pressure medium flow through a respective one of a plurality of pressure medium guiding passages comprised in the pressure medium distribution conduit 8, wherein each of the plurality of pressure medium guiding passages may permit pressure medium from the at least one pressure medium guiding passage 12 of the furnace chamber 18 to enter the load compartment 19, or vice versa.

As illustrated in FIG. 7, during a heating phase of the treatment cycle, the valves 15 may be open so as to not obstruct pressure medium flow through the pressure medium guiding passage 51 of the pressure medium distribution conduit 8. Thereby, during a heating phase of the treatment cycle, a circulating pressure medium flow in the inner convection loop of the furnace chamber 18 may not be obstructed or impeded, so that the inner convection loop of the furnace chamber 18 is ‘open’.

As illustrated in FIG. 8, during a cooling phase of the treatment cycle, the valves 15 may be closed so as to obstruct pressure medium flow through the pressure medium guiding passage 51 of the pressure medium distribution conduit 8. Thereby, during a cooling phase of the treatment cycle, a circulating pressure medium flow in the inner convection loop of the furnace chamber 18 may be obstructed, so that the inner convection loop of the furnace chamber 18 is ‘closed’.

The pressing arrangement may comprise a control unit (not shown in FIGS. 7 and 8) which may be communicatively coupled to the valve 15 for controlling the valve 15 so as to be closed, such as illustrated in FIG. 8, or so as to be open, such as illustrated in FIG. 7. To that end, the pressing arrangement may comprise an actuating mechanism or system communicatively coupled with control unit and by means of which the valve 15 may be opened or closed. For example, the control unit may be configured to control the valve 15 such that the valve 15 is closed during a cooling phase of the treatment cycle and such that the valve 15 is open during a heating phase of the treatment cycle.

The flow generator 16 may for example comprise an ejector arrangement 16, which—Similar to the description in the foregoing of the flow generator 16 illustrated in FIGS. 1 and 2—may comprise a single stage ejector, or a multi-stage ejector (e.g., a two-stage ejector). For example, the flow generator 16 or ejector arrangement 16 may comprise a primary flow generator or ejector and a secondary flow generator or ejector, wherein the primary flow generator or ejector is arranged to draw pressure medium from the pressure medium guiding passage 10 which enters the space 5 into the primary flow generator or ejector. The output from the primary flow generator or ejector may be input into the secondary flow generator or ejector, and the output from the secondary flow generator or ejector may be ejected into the pressure medium conduit 20, 21, 22.

In conclusion, a pressing arrangement is disclosed. The pressing arrangement includes a pressure vessel comprising a furnace chamber. The furnace chamber comprises a load compartment arranged within the furnace chamber and is arranged so as to allow for a flow of pressure medium through the load compartment. The furnace chamber comprises at least one pressure medium guiding passage in fluid communication with the load compartment so as to form an inner convection loop, wherein pressure medium in the inner convection loop is guided through the load compartment and through the at least one pressure medium guiding passage of the furnace chamber and back to the load compartment, or vice versa. The pressure vessel comprises at least one adjustable throttle configured to selectively impede or obstruct pressure medium flow in at least a portion of the at least one pressure medium guiding passage of the furnace chamber, thereby selectively impeding or obstructing a flow of pressure medium in the inner convection loop.

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A pressing arrangement, the pressing arrangement including a pressure vessel comprising:

a furnace chamber including a furnace, wherein the furnace chamber is at least in part surrounded by a heat insulated casing, the furnace chamber includes a load compartment located within the furnace chamber, the load compartment configured to hold at least one article to be treated, wherein the furnace chamber is configured to enable a flow of a pressure medium through the load compartment, the furnace chamber includes at least one pressure medium guiding passage at least in part defined between the heat insulated casing and the load compartment, the at least one pressure medium guiding passage in fluid communication with the load compartment so as to at least partially define an inner convection loop, the furnace chamber is configured to guide the pressure medium in the inner convection loop to flow in one of two opposite circulation directions through the load compartment, through the at least one pressure medium guiding passage of the furnace chamber, and back to the load compartment; and at least one adjustable throttle that is configured to selectively obstruct a pressure medium flow in at least a portion of the at least one pressure medium guiding passage of the furnace chamber to selectively obstruct a flow of the pressure medium in the inner convection loop, wherein the at least one adjustable throttle is configured to controllably and selectively obstruct the pressure medium flow in the at least one pressure medium guiding passage of the furnace chamber, wherein the pressing arrangement is configured to treat the at least one article based on hot pressing, the treating of the at least one article including at least one heating phase, in which the at least one article is heated, and at least one cooling phase, in which the at least one article is cooled, wherein the at least one adjustable throttle is configured to obstruct the pressure medium flow in at least the portion of the at least one pressure medium guiding passage of the furnace chamber during the at least one cooling phase, and not obstruct the pressure medium flow in at least the portion of the at least one pressure medium guiding passage of the furnace chamber during the at least one heating phase, wherein the heat insulated casing includes a heat insulating portion, and a housing partly enclosing the heat insulating portion, wherein the heat insulated casing has a pressure medium guiding passage formed between portions of the heat insulating portion and the housing, the pressure medium guiding passage of the heat insulated casing being in fluid communication with the furnace chamber so as the at least partially define an outer cooling loop and being configured to guide pressure medium from the furnace chamber to flow towards a top end closure of the pressure vessel to a space between the top end closure and the furnace chamber, wherein a heat absorbing element is arranged within the space between the top end closure and the furnace chamber.

2. The pressing arrangement according to claim 1, the pressure vessel further comprising:

at least one flow generator configured to selectively generate an injection flow of the pressure medium into the load compartment by transportation of the pressure medium from a separate space that is located below a bottom insulating portion of the pressure vessel and above a bottom end portion of the pressure vessel, and injection of the pressure medium into the load compartment, wherein the at least one adjustable throttle is located in a pressure medium flow path of the injection flow of the pressure medium into the load compartment, wherein the at least one adjustable throttle is configured to selectively obstruct the pressure medium flow in at least the portion of the at least one pressure medium guiding passage of the furnace chamber based on a flow level of any flow of the pressure medium into the load compartment, generated by transportation of the pressure medium upwards from the separate space, that is impinging on the at least one adjustable throttle.

3. The pressing arrangement according to claim 1, the pressure vessel further comprising:

at least one flow generator configured to selectively generate an injection flow of the pressure medium into the load compartment by transportation of the pressure medium from a separate space that is located below a bottom insulating portion of the pressure vessel and above a bottom end portion of the pressure vessel, and injection of the pressure medium into the load compartment, wherein the at least one adjustable throttle is configured to controllably obstruct the pressure medium flow in at least the portion of the at least one pressure medium guiding passage of the furnace chamber based on a flow level of any flow of the pressure medium into the load compartment generated by transportation of the pressure medium upwards from the separate space.

4. The pressing arrangement according to claim 1, the pressure vessel further comprising:

at least one flow generator configured to selectively generate an injection flow of the pressure medium into the load compartment by transportation of the pressure medium from a separate space that is located below a bottom insulating portion of the pressure vessel and above a bottom end portion of the pressure vessel, and injection of the pressure medium into the load compartment, wherein the pressure vessel is configured to cause a pressure medium flow path of the at least one pressure medium guiding passage of the furnace chamber and a pressure medium flow path of the injection flow of the pressure medium into the load compartment to intersect at at least one pressure medium flow path intersection, wherein the at least one adjustable throttle is located at the at least one pressure medium flow path intersection.

5. The pressing arrangement according to claim 4, wherein the injection flow of the pressure medium into the load compartment is generated by injection of the pressure medium into the load compartment through a pressure medium conduit having an inlet located with the separate space, an intermediate portion coupled by the inlet, and an outlet coupled to the intermediate portion, the at least one pressure medium flow path intersection is located at at least one opening in the pressure medium conduit, and the at least one adjustable throttle is configured to selectively obstruct a pressure medium flow through the at least one opening in the pressure medium conduit.

6. The pressing arrangement according to claim 5, wherein the at least one opening in the pressure medium conduit is between the outlet of the pressure medium conduit and the bottom insulating portion.

7. The pressing arrangement according to claim 5, wherein the at least one adjustable throttle comprises at least one movable throttle body configured to selectively obstruct the pressure medium flow through the at least one opening in the pressure medium conduit, and the at least one movable throttle body is movable at least between a first position in which the at least one movable throttle body closes the at least one opening in the pressure medium conduit, so as to obstruct the pressure medium flow through the at least one opening in the pressure medium conduit, and a second position in which the at least one movable throttle body is spaced from the at least one opening in the pressure medium conduit, so as to not obstruct the pressure medium flow through the at least one opening in the pressure medium conduit.

8. The pressing arrangement according to claim 7, wherein the at least one movable throttle body is located within the pressure medium conduit.

9. The pressing arrangement according to claim 7, wherein the at least one movable throttle body is located outside the pressure medium conduit.

10. The pressing arrangement according to claim 7, wherein the at least one movable throttle body is pivotally arranged within the pressure medium conduit or outside the pressure medium conduit.

11. The pressing arrangement according to claim 7, wherein the at least one movable throttle body is slidably arranged on an inside of the pressure medium conduit or on an outside of the pressure medium conduit.

12. The pressing arrangement according to claim 1, wherein the pressure vessel comprises:

at least one flow generator configured to selectively generate an injection flow of the pressure medium into the load compartment by transportation of the pressure medium from a separate space that is located below a bottom insulating portion of the pressure vessel and above a bottom end portion of the pressure vessel, and injection of the pressure medium into the load compartment, wherein the injection flow of the pressure medium into the load compartment is generated by injection of the pressure medium into the load compartment through a pressure medium conduit having an inlet located within the separate space, an intermediate portion coupled to the inlet, and an outlet coupled to the intermediate portion, wherein the pressure medium conduit includes at least one pressure medium distribution conduit that is located at the outlet of the pressure medium conduit, the pressure medium distribution conduit configured to inject the pressure medium transported from the separate space into the load compartment, wherein the at least one pressure medium distribution conduit includes at least one particular pressure medium guiding passage configured to permit the pressure medium to flow from the at least one pressure medium guiding passage of the furnace chamber to enter the load compartment, or from the load compartment to enter the at least one pressure medium guiding passage, and wherein the at least one adjustable throttle is configured to selectively obstruct a pressure medium flow through the at least one pressure medium guiding passage of the at least one pressure medium distribution conduit.

13. The pressing arrangement according to claim 1, wherein the load compartment comprises at least one opening in a side wall of the load compartment, the at least one opening in the side wall of the load compartment configured to permit the pressure medium to flow from the at least one pressure medium guiding passage of the furnace chamber to enter the load compartment, or from the load compartment to enter the at least one pressure medium guiding passage, and the at least one adjustable throttle is configured to selectively obstruct a pressure medium flow through the at least one opening in the side wall of the load compartment.

14. The pressing arrangement according to claim 13, wherein the load compartment is defined by a load basket that is configured to hold the at least one article to be treated, and the at least one opening in the side wall of the load compartment is constituted by at least one opening in a side wall of the load basket.

15. The pressing arrangement according to claim 13, wherein the at least one adjustable throttle comprises at least one movable throttle body configured to selectively obstruct a particular pressure medium flow through the at least one opening in the side wall of the load compartment, the at least one movable throttle body is movable at least between a first position in which the at least one movable throttle body closes the at least one opening in the side wall of the load compartment, so as to obstruct the particular pressure medium flow through the at least one opening in the side wall of the load compartment, and a second position in which the at least one movable throttle body is spaced from the at least one opening in the side wall of the load compartment, so as to not obstruct the particular pressure medium flow through the at least one opening in the side wall of the load compartment.

16. The pressing arrangement according to claim 15, wherein the at least one movable throttle body is located outside the load compartment.

17. The pressing arrangement according to claim 15, wherein the at least one movable throttle body is pivotally arranged outside the load compartment or inside the load compartment.

18. The pressing arrangement according to claim 15, wherein the at least one movable throttle body is slidably arranged on an outside of the load compartment or on an inside of the load compartment.

19. A method comprising:

providing the pressing arrangement of claim 1; and operating the pressing arrangement to perform treatment of at least one article based on hot pressing, the operating including selectively obstructing the pressure medium flow in at least the portion of the at least one pressure medium guiding passage of the furnace chamber of the pressing arrangement based on operation of the at least one adjustable throttle of the pressing arrangement, to selectively obstruct the flow of the pressure medium in the inner convection loop of the pressing arrangement based on a current phase of treating of the at least one article, wherein the selectively obstructing of the pressure medium flow in at least the portion of the at least one pressure medium guiding passage of the furnace chamber based on the current phase of the treating of the at least one article includes obstructing the pressure medium flow in at least the portion of the at least one pressure medium guiding passage of the furnace chamber during the at least one cooling phase, and not obstructing the pressure medium flow in at least the portion of the at least one pressure medium guiding passage of the furnace chamber during the at least one heating phase.

* * * * *